US011567513B2

United States Patent
Torii et al.

(10) Patent No.: US 11,567,513 B2
(45) Date of Patent: Jan. 31, 2023

(54) UNMANNED AERIAL VEHICLE CONTROL SYSTEM, UNMANNED AERIAL VEHICLE CONTROL METHOD, AND PROGRAM

(71) Applicant: RAKUTEN GROUP, INC., Tokyo (JP)

(72) Inventors: Junji Torii, Tokyo (JP); Jun Takizawa, Chino (JP)

(73) Assignee: RAKUTEN GROUP, INC., Tokyo (JP)

(*) Notice: Subject to any disclaimer, the term of this patent is extended or adjusted under 35 U.S.C. 154(b) by 325 days.

(21) Appl. No.: 16/645,486

(22) PCT Filed: Aug. 16, 2018

(86) PCT No.: PCT/JP2018/030447
§ 371 (c)(1),
(2) Date: Mar. 8, 2020

(87) PCT Pub. No.: WO2020/035932
PCT Pub. Date: Feb. 20, 2020

(65) Prior Publication Data
US 2020/0209894 A1   Jul. 2, 2020

(51) Int. Cl.
*G05D 1/10* (2006.01)
*B64C 39/02* (2006.01)
(Continued)

(52) U.S. Cl.
CPC ......... *G05D 1/1064* (2019.05); *B64C 39/024* (2013.01); *B64D 47/02* (2013.01);
(Continued)

(58) Field of Classification Search
CPC .. G05D 1/0022; G05D 1/0016; G05D 1/0033; G05D 1/1064; B64C 39/024;
(Continued)

(56) References Cited

U.S. PATENT DOCUMENTS

2018/0164807 A1* 6/2018 Kuhara ................ G05D 1/0033
2018/0373238 A1* 12/2018 Bergan .................... H04W 4/02
(Continued)

FOREIGN PATENT DOCUMENTS

JP    2017-74826 A  *  4/2017
JP    2017074826 A     4/2017
(Continued)

OTHER PUBLICATIONS

IP.com, English Translation of Japanese Patent Application Publication No. JP 2017-74826A to Sugaki et al. (with annotated paragraph numbers) (Year: 2017).*
(Continued)

*Primary Examiner* — Christian Chace
*Assistant Examiner* — John D. Scarito
(74) *Attorney, Agent, or Firm* — HEA Law PLLC

(57) ABSTRACT

Stability of an unmanned aerial vehicle is sought by using a flight controller of an unmanned aerial vehicle control system for controlling flying by an unmanned aerial vehicle based on an instruction from a first operator. A determiner is used to determine whether a second operator visually recognizes the unmanned aerial vehicle based on a predetermined determination method. A switcher is used to switch, based on a result of the determination obtained by the determiner, from a first state, in which the unmanned aerial vehicle flies in accordance with an instruction from the first operator, to a second state, in which the unmanned aerial vehicle flies in accordance with an instruction from the second operator.

14 Claims, 14 Drawing Sheets

(51) Int. Cl.
  *B64D 47/02* (2006.01)
  *G05D 1/00* (2006.01)
  *B64D 47/08* (2006.01)

(52) U.S. Cl.
  CPC ............ *B64D 47/08* (2013.01); *G05D 1/0016* (2013.01); *B64C 2201/027* (2013.01); *B64C 2201/127* (2013.01); *B64C 2201/146* (2013.01); *B64D 2203/00* (2013.01)

(58) Field of Classification Search
  CPC ........ B64C 2201/027; B64C 2201/127; B64C 2201/146; B64D 47/02; B64D 47/08; B64D 2203/00
  See application file for complete search history.

(56) References Cited

U.S. PATENT DOCUMENTS

2019/0049947 A1* 2/2019 Hayama ................ B64C 39/024
2019/0176967 A1 6/2019 Ohata et al.

FOREIGN PATENT DOCUMENTS

| JP | 2017141010 A | 8/2017 |
| WO | 2017037988 A1 | 3/2017 |
| WO | 2017170148 A1 | 10/2017 |

OTHER PUBLICATIONS

Office Action for corresponding JP Application No. 2019-528774 with a partial translation.
https://dl.djicdn.com/downloads/phantom_3_standard/en/Phantom_3_Standard_User_Manual_V1.4.pdf.

* cited by examiner

FIG.6

| COMMUNICATOR | OPERATION AUTHORITY FLAG |
|---|---|
| FIRST WIRELESS COMMUNICATOR | 1 |
| SECOND WIRELESS COMMUNICATOR | 0 |

130A — FIRST WIRELESS COMMUNICATOR
130B — SECOND WIRELESS COMMUNICATOR

FIG.7

| TIME | LIGHT EMISSION |
|---|---|
| 0 SECONDS~0.5 SECONDS | RED |
| 0.5 SECONDS~1.0 SECONDS | EXTINGUISHED |
| 1.0 SECONDS~1.5 SECONDS | BLUE |
| 1.5 SECONDS~2.0 SECONDS | EXTINGUISHED |
| 2.0 SECONDS~2.5 SECONDS | GREEN |
| 2.5 SECONDS~3.0 SECONDS | EXTINGUISHED |

UNMANNED AERIAL VEHICLE CONTROL SYSTEM, UNMANNED AERIAL VEHICLE CONTROL METHOD, AND PROGRAM

CROSS REFERENCE TO RELATED APPLICATIONS

This application is a National Stage of International Application No. PCT/JP2018/030447 filed on Aug. 16, 2018. The contents of the above document is incorporated herein by reference in its entirety.

TECHNICAL FIELD

The present invention relates to an unmanned aerial vehicle control system, an unmanned aerial vehicle control method, and a program.

BACKGROUND ART

Hitherto, there has been known a technology of flying an unmanned aerial vehicle. For example, in Non-Patent Literature 1, there is described a technology of causing an unmanned aerial vehicle to return to a home point (e.g., location of operator) when the unmanned aerial vehicle is in a lost state, which is a state in which the unmanned aerial vehicle does not receive a control signal from a wireless operation device.

Further, for example, in Patent Literature 1, there is described a technology of determining whether or not an unmanned aerial vehicle is flying within a range capable of being visually recognized by an operator based on a distance between the unmanned aerial vehicle and the operator. In the technology of Patent Literature 1, when it is determined that the unmanned aerial vehicle is not flying within the range capable of being visually recognized by the operator, the unmanned aerial vehicle hovers at the current place.

Further, for example, in Patent Literature 2, there is described a technology of determining whether or not an unmanned aerial vehicle is flying within a range capable of being visually recognized by an operator based on an image picked up by a camera of the unmanned aerial vehicle, for example. In the technology of Patent Literature 2, when it is determined that the unmanned aerial vehicle is not flying within the range capable of being visually recognized by the operator, the unmanned aerial vehicle switches to autonomous flight or hovers at the current place.

CITATION LIST

Non Patent Literature

[NPL 1] https://dl.djicdn.com/downloads/phantom 3 standard/en/Phanto m_3_Standard_User_Manual V1.4.pdf

Patent Literature

[PTL 1] WO 2017/037988 A1
[PTL 2] WO 2017/170148 A1

SUMMARY OF INVENTION

Technical Problem

In such a technology as described above, each of the plurality of operators may be responsible for an operation range assigned thereto, and a first operator may pass an operation authority to a second operator. In this case, it is difficult to enable the unmanned aerial vehicle to fly stably at the time of passing the operation authority unless the second operator is given the operation authority while visually recognizing the unmanned aerial vehicle. In this respect, in each of Literatures given above, there is no description of control to be performed at the time of passing the operation authority. In the related art, it is difficult to enable the unmanned aerial vehicle to fly stably at the time of passing the operation authority.

One or more embodiments of the present invention has been made in view of the above-mentioned issue, and has an object to ensure stability of flying by an unmanned aerial vehicle.

Solution to Problem

In response to the issue described above, an unmanned aerial vehicle control system according to one embodiment of the present invention includes: flight control means for controlling flying by an unmanned aerial vehicle based on an instruction from a first operator; determination means for determining whether a second operator visually recognizes the unmanned aerial vehicle based on a predetermined determination method; and switching means for switching from a first state to a second state based on a result of the determination obtained by the determination means, wherein the unmanned aerial vehicle flies in accordance with an instruction from the first operator in the first state and the unmanned aerial vehicle flies in accordance with an instruction from the second operator in the second state.

An unmanned aerial vehicle control method according to one embodiment of the present invention includes: a flight control step of controlling flying by an unmanned aerial vehicle based on an instruction from a first operator; a determination step of determining whether a second operator visually recognizes the unmanned aerial vehicle based on a predetermined determination method; and a switching step of switching from a first state to a second state based on a result of the determination obtained in the determination step, wherein the unmanned aerial vehicle flies in accordance with an instruction from the first operator in the first state and the unmanned aerial vehicle flies in accordance with an instruction from the second operator in the second state.

A program according to one embodiment of the present invention causes a computer to function as: flight control means for controlling flying by an unmanned aerial vehicle based on an instruction from a first operator; determination means for determining whether a second operator visually recognizes the unmanned aerial vehicle based on a predetermined determination method; and switching means for switching from a first state to a second state based on a result of the determination obtained by the determination means, wherein the unmanned aerial vehicle flies in accordance with an instruction from the first operator in the first state and the unmanned aerial vehicle flies in accordance with an instruction from the second operator in the second state.

Further, in one aspect of the present invention, the switching means is configured to: restrict switching from the first state to the second state when the second operator is not determined to visually recognize the unmanned aerial vehicle; and switch from the first state to the second state when the second operator is determined to visually recognize the unmanned aerial vehicle.

Further, in one aspect of the present invention, the unmanned aerial vehicle control system further includes means for determining whether the first operator visually recognizes the unmanned aerial vehicle based on a predetermined determination method, and the switching means is configured to switch from the first state to the second state based further on a result of determination obtained by the means.

Further, in one aspect of the present invention, the switching means is configured to: restrict switching from the first state to the second state when the first operator is not determined to visually recognize the unmanned aerial vehicle or when the second operator is not determined to visually recognize the unmanned aerial vehicle; and switch from the first state to the second state when the first operator is determined to visually recognize the unmanned aerial vehicle and the second operator is determined to visually recognize the unmanned aerial vehicle.

Further, in one aspect of the present invention, the switching means is configured to switch from the first state to the second state when the first operator is not determined to visually recognize the unmanned aerial vehicle and the second operator is determined to visually recognize the unmanned aerial vehicle.

Further, in one aspect of the present invention, the unmanned aerial vehicle control system further includes notification means for issuing a predetermined notification to the second operator when the first state is to be switched to the second state.

Further, in one aspect of the present invention, the unmanned aerial vehicle control system further includes reception means for receiving a switching instruction from the second operator, and the switching means is configured to switch from the first state to the second state based on a result of determination obtained by the determination means when the switching instruction is accepted.

Further, in one aspect of the present invention, the unmanned aerial vehicle control system further includes means for determining whether the unmanned aerial vehicle is located within a predetermined switching region, and the switching means is configured to switch from the first state to the second state based on a result of determination obtained by the determination means when the unmanned aerial vehicle is determined to be located within the predetermined switching region.

Further, in one aspect of the present invention, the determination means is configured to determine whether the second operator visually recognizes the unmanned aerial vehicle based on an image picked up by photographing means of at least one of the unmanned aerial vehicle or the second operator.

Further, in one aspect of the present invention, at least one of the unmanned aerial vehicle or the second operator is configured to output a predetermined pattern of light, and the determination means is configured to determine whether the second operator visually recognizes the unmanned aerial vehicle by determining based on the image whether the predetermined pattern of light is detected.

Further, in one aspect of the present invention, at least one of the unmanned aerial vehicle or the second operator is configured to output a directional radio wave or a directional sound wave, and the determination means is configured to determine whether the second operator visually recognizes the unmanned aerial vehicle based on the directional radio wave or the directional sound wave detected by detection means of at least one of the unmanned aerial vehicle or the second operator.

Further, in one aspect of the present invention, the unmanned aerial vehicle control system further includes: means for acquiring unmanned aerial vehicle positional information on a position of the unmanned aerial vehicle; and means for acquiring operator positional information on a position of the second operator, and the determination means is configured to determine whether the second operator visually recognizes the unmanned aerial vehicle based on the operator positional information and the unmanned aerial vehicle positional information.

Further, in one aspect of the present invention, the determination means is configured to determine whether the second operator visually recognizes the unmanned aerial vehicle based on an operation performed by the second operator.

Advantageous Effects of Invention

According to one or more embodiments of the present invention, the stability of the unmanned aerial vehicle can be ensured.

BRIEF DESCRIPTION OF DRAWINGS

FIG. 6 is a table for showing an example of data storage of operation authority data.

FIG. 7 is a table for showing an example of data storage of light emission pattern data.

DESCRIPTION OF EMBODIMENTS

1. Entire Configuration of Unmanned Aerial Vehicle Control System

Figure 1:
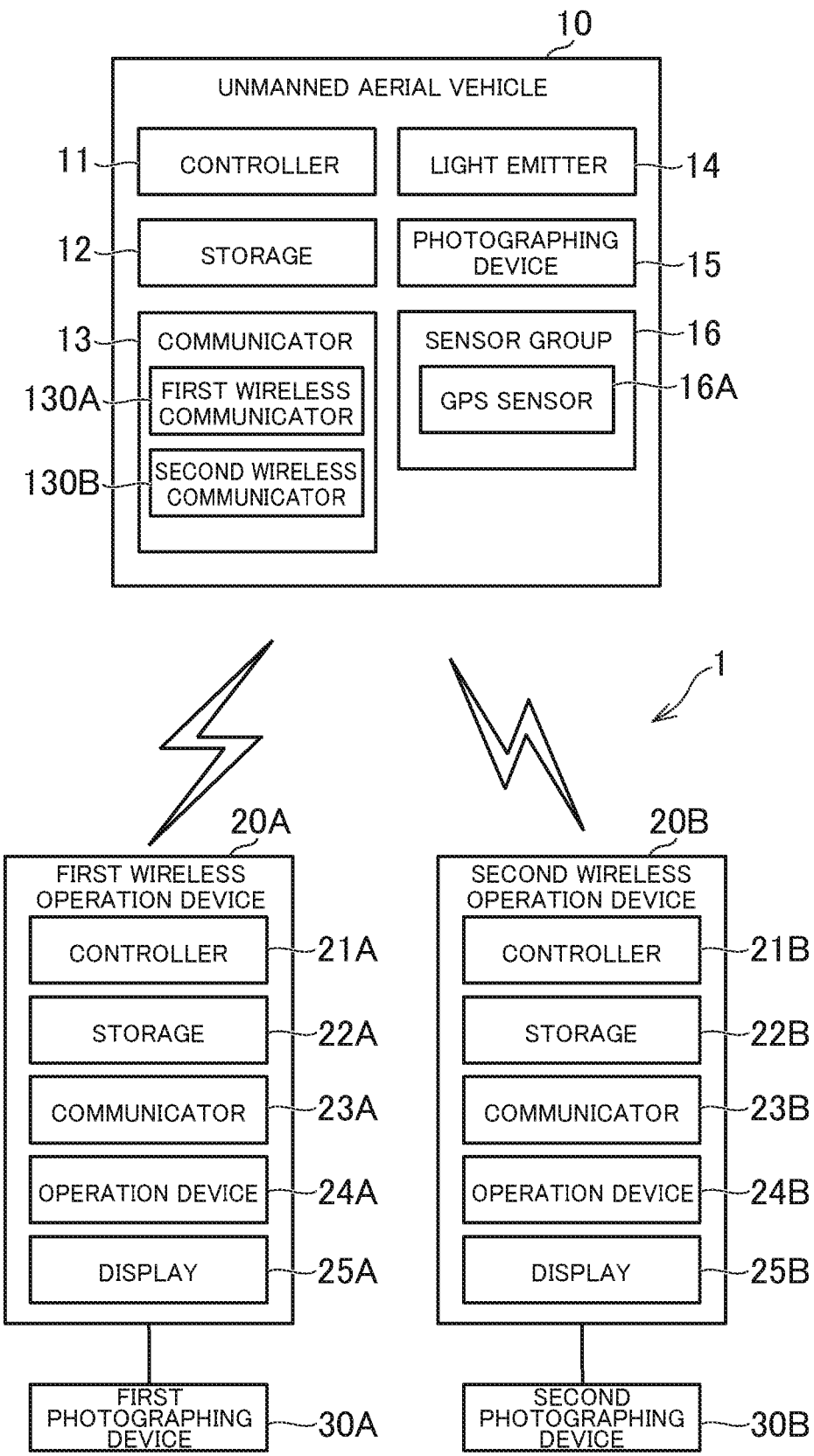
FIG. 1 is a diagram for illustrating an entire configuration of an unmanned aerial vehicle control system.

A description is now given of an unmanned aerial vehicle control system according to an exemplary embodiment of the present invention. FIG. 1 is a diagram for illustrating an entire configuration of the unmanned aerial vehicle control system. As illustrated in FIG. 1, the unmanned aerial vehicle control system 1 includes an unmanned aerial vehicle 10, a first wireless operation device 20A, a second wireless operation device 20B, a first photographing device 30A, and a second photographing device 30B.

In this embodiment, when the first wireless operation device 20A and the second wireless operation device 20B are not particularly required to be distinguished from each other, those devices are simply referred to as "wireless operation device 20". Similarly, when the first photographing device 30A and the second photographing device 30B are not particularly required to be distinguished from each other, those devices are simply referred to as "photographing device 30".

Further, in this embodiment, a description is given of a case in which one unmanned aerial vehicle 10 is included in the unmanned aerial vehicle control system 1. However, the unmanned aerial vehicle control system 1 may include a plurality of unmanned aerial vehicles 10. Further, in this embodiment, a description is given of a case in which the unmanned aerial vehicle control system 1 includes two wireless operation devices 20 and two photographing devices 30. However, three or more wireless operation devices 20 and three or more photographing devices 30 may be included in the unmanned aerial vehicle control system 1.

The unmanned aerial vehicle 10 is an aerial vehicle without a person, and is, for example, an unmanned aerial vehicle (so-called "drone") driven by a battery or an unmanned aerial vehicle driven by an engine. For example, the unmanned aerial vehicle may store a package such as a product or a piece of mail, and flies to a delivery destination to deliver the package, or flies to a collection destination to collect the package. The unmanned aerial vehicle 10 may fly for various purposes, and in addition to the purpose of delivering a package, the unmanned aerial vehicle 10 may fly for a purpose of photographing, detecting weather information, guarding, or distributing pesticides in a farm, for example.

The unmanned aerial vehicle 10 includes a controller 11, a storage 12, a communicator 13, a light emitter 14, a photographing device 15, and a sensor group 16. Although the unmanned aerial vehicle 10 includes a propeller, a motor, a battery, and an antenna, for example, a description thereof is omitted here.

The controller 11 includes, for example, at least one microprocessor. The controller 11 executes processing in accordance with programs and data stored in the storage 12. The storage 12 includes a main memory and an auxiliary memory. For example, the main memory is a volatile memory, for example, a RAM, and the auxiliary memory is a non-volatile memory such as a hard disk drive or a flash memory.

The communicator 13 includes a communication interface for wired communication or wireless communication. The communicator 13 is configured to perform communication under a predetermined communication protocol. The communicator 13 may include both of a transmitter and a receiver, or may include only a receiver without including a transmitter.

The communication interface included in the communicator 13 may have one system (one channel), but in this embodiment, a description is given of a case in which the communicator 13 includes communication interfaces of a plurality of systems (a plurality of channels). For example, the communicator 13 includes a first wireless communicator 130A and a second wireless communicator 130B.

In this embodiment, when the first wireless communicator 130A and the second wireless communicator 130B are not particularly required to be distinguished from each other, those components are simply referred to as "wireless communicator 130". Further, in this embodiment, a description is given of a case in which the unmanned aerial vehicle 10 includes two wireless communicators 130. However, the unmanned aerial vehicle 10 may include only one wireless communicator 130, or may include three or more wireless communicators 130.

For example, the wireless communicators 130 use different frequency bands (e.g., frequency in 2.4 GHz band or 5.0 GHz band) so as to avoid interferences among the wireless communicators 130. For example, the first wireless communicator 130A uses a first frequency band (first channel), and the second wireless communicator 130B uses a second frequency band (second channel). It is assumed that the first frequency band and the second frequency band use at least different central frequencies, but there may be an overlapping portion, and parts of those frequency bands may overlap with each other.

Further, in this embodiment, a description is given of a wireless communication method for a specific device (e.g., so-called "radio controller"), such as FASST, FHSS, DMSS, or AFHSS. However, various known methods can be applied as the wireless communication method itself, and for example, methods for a general device, such as wireless LAN, Bluetooth (trademark), iBeacon (trademark), or Wi-Fi Direct (trademark), may be applied. Further, any one of short-range wireless communication, middle-range wireless communication, and long-range wireless communication may be employed for wireless communication. The communicator 23 may be connected to a network, for example, the Internet.

The light emitter 14 includes at least one light source. Various kinds of lights can be applied as the light source itself, and for example, an LED light, an incandescent lamp (e.g., halogen lamp), or a discharge lamp (e.g., fluorescent light) may be used. The light emitter 14 emits light of at least one color. For example, when the light emitter 14 includes an LED light, the light emitter 14 may emit light of at least one color among a red color, a blue color, and a green color, or may emit light of the mixed color. Further, for example, when the light emitter 14 includes an incandescent lamp or a discharge lamp, the light emitter 14 may emit light of a whitish color. The light emitter 14 switches on/off of light emission based on an instruction from the controller 11.

The light emitter 14 can be arranged at any position of the unmanned aerial vehicle 10, and the unmanned aerial vehicle 10 can emit light in any direction. For example, the light emitter 14 may be arranged in a longitudinal direction (roll-axis direction) of the unmanned aerial vehicle 10, and the unmanned aerial vehicle 10 may emit light in the longitudinal direction.

Further, for example, the light emitter 14 may be arranged in a lateral direction (pitch-axis direction) of the unmanned aerial vehicle 10, and the unmanned aerial vehicle 10 may emit light in the lateral direction. Further, for example, the light emitter 14 may be arranged in a downward direction (yaw-axis direction) of the unmanned aerial vehicle 10, and the unmanned aerial vehicle 10 may emit light in the downward direction. Further, for example, LED lights and other lights of the light emitter 14 may be arranged on side surfaces of the unmanned aerial vehicle 10, and the unmanned aerial vehicle 10 may emit light toward surroundings. In this case, the unmanned aerial vehicle 10 may emit light so as to cover 360 degrees around the unmanned aerial vehicle 10, or may emit light toward only a specific range (e.g., any angle equal to or larger than 90 degrees and smaller than 360 degrees).

The photographing device 15 includes at least one camera. For example, the photographing device 15 includes an image pickup element such as a CCD image sensor or a CMOS image sensor, and records an image picked up by the image pickup element as digital data. The image may be a still image or a moving image picked up continuously at a predetermined frame rate.

The sensor group 16 includes at least one sensor, and includes a GPS sensor 16A, for example. The GPS sensor 16A includes a receiver configured to receive signals from satellites, and for example, detects positional information based on the signals received by the receiver. The positional information is latitude/longitude information or coordinate information, for example.

The unmanned aerial vehicle 10 may mount any sensor, and the sensor group 16 may include any sensor such as an acceleration sensor, a gyro sensor, a wind sensor, a geomagnetic sensor, an altitude sensor, a displacement sensor, a pressure-sensitive sensor, or a temperature sensor.

The wireless operation device 20 is a device for operating the unmanned aerial vehicle 10, and is, for example, a proportional controller or a controller. The wireless operation device 20 is only required to be capable of performing direct or indirect communication to/from the unmanned aerial vehicle 10, and may be, for example, a smartphone (cell phone), a tablet terminal, or a personal computer. The term "direct communication" refers to communication without intervention of another computer, for example, a server computer, and the term "indirect communication" refers to communication via another computer or via the Internet or other networks.

In this embodiment, a description is given of a case in which the first wireless operation device 20A and the second wireless operation device 20B have the same configuration. However, the configurations may be different from each other. In the following, when the controllers 21A and 21B are not particularly required to be distinguished from each other, those components are simply referred to as "controller 21". Similarly, the storages 22A and 22B, the communicators 23A and 23B, the operation devices 24A and 24B, and the displays 25A and 25B may be simply referred to as "storage 22", "communicator 23", "operation device 24", and "display 25", respectively.

As illustrated in FIG. 1, the wireless operation device 20 includes the controller 21, the storage 22, the communicator 23, the operation device 24, and the display 25. The hardware configurations of the controller 21, the storage 22, and the communicator 23 are similar to those of the controller 11, the storage 12, and the communicator 13, respectively, and thus a description thereof is omitted here. The wireless operation device 20 includes an antenna and a battery, for example, but a description thereof is omitted here.

For example, the communicator 23 may include both of a transmitter and a receiver so as to enable the unmanned aerial vehicle 10 and the wireless operation device 20 to communicate to/from each other. In other cases, the communicator 23 may include only the transmitter without particularly including a receiver so as to enable the wireless operation device 20 to communicate to the unmanned aerial vehicle 10 in only one direction. It is assumed that a frequency band to be used by the communicator 23 is adjusted in advance. That is, it is assumed that which channel is to be used by the communicator 23 is adjusted in advance.

Further, for example, the communicator 23A of the first wireless operation device 20A uses the first frequency band to communicate to/from the first wireless communicator 130A of the unmanned aerial vehicle 10. Further, for example, the communicator 23B of the second wireless operation device 20B uses the second frequency band to communicate to/from the second wireless communicator 130B of the unmanned aerial vehicle 10. The communicator 23 may be connected to a network, for example, the Internet.

The operation device 24 includes at least one operation component for operating the unmanned aerial vehicle 10. The operation component is only required to be a component capable of receiving input from an operator, and may include, for example, a button, a stick, a switch, a lever, a touch panel, a keyboard, or a mouse. The display 25 includes a liquid crystal display or an organic EL display, for example. The display 25 displays a screen in accordance with an instruction from the controller 21.

For example, when the power of the wireless operation device 20 is turned on, the wireless operation device 20 transmits instruction information toward surroundings via the communicator 23. The instruction information is information for indicating an instruction from the operator, and is information having a predetermined data format. In other words, the instruction information is information for indicating an operation state of each operation component included in the operation device 24, and is a wireless control signal for the unmanned aerial vehicle 10.

For example, the instruction information includes information such as a direction and angle of tilting of a stick or lever and an on/off state of a button or switch. Further, for example, the instruction information may include details of an instruction input by the operator via a touch panel, a keyboard, or a mouse. Further, for example, when the posture of the wireless operation device 20 is used for operating the unmanned aerial vehicle 10, the instruction information may include the posture of the wireless operation device 20. Further, for example, when a sound of the operator is used for operating the unmanned aerial vehicle 10, the instruction information may include a result of detecting the sound. Further, for example, the instruction information may include at least one of a movement direction or movement speed specified by the operator.

In this embodiment, a function for requesting an authority to operate the unmanned aerial vehicle 10 is associated with any operation component of the operation device 24, and when the operator operates the operation component, it is possible to request the operation authority from the unmanned aerial vehicle 10.

The operation authority is an authority to operate the unmanned aerial vehicle 10, and is an authority to control the unmanned aerial vehicle 10. In this embodiment, a description is given of a case in which there is only one wireless operation device 20 to which the operation authority is given, but the operation authority may be given to the plurality of wireless operation devices 20 at the same time. A wireless operation device 20 to which the operation authority is given can control the unmanned aerial vehicle 10. For example, when the operation authority is given, the instruction information becomes effective, whereas when the operation authority is not given, the instruction information becomes ineffective. In other words, a wireless operation device 20 to which the operation authority is given can influence flight control of the unmanned aerial vehicle 10, and a wireless operation device 20 to which the operation authority is not given does not influence flight control of the unmanned aerial vehicle 10.

In this embodiment, it is assumed that a function for requesting the operation authority is associated with a specific button of the operation device 24. This button is a button for giving an instruction to switch the operation authority, and thus is hereinafter referred to as "switching instruction button". The function for requesting the operation authority may be associated with an operation component other than the switching instruction button, and for example, may be associated with a stick, a switch, or a lever. Further, for example, the operation authority may be requested when a predetermined operation is performed via a touch panel, a keyboard, or a mouse. In other cases, for example, the operation authority may be requested by a posture of the terminal or a voice of the operator.

For example, when the unmanned aerial vehicle 10 is included in the communication range of the wireless operation device 20, instruction information is transmitted from the wireless operation device 20 to the unmanned aerial vehicle 10. The unmanned aerial vehicle 10 may receive the instruction information after establishing communication to/from the wireless operation device 20 under a predetermined communication protocol, or may receive the instruction information without particularly executing processing of establishing communication.

The wireless operation device 20 may transmit instruction information regularly, or may transmit instruction information only when the operator performs some operation (that is, unregularly). Further, the instruction information is not required to include operation states of all the operation components, and may include operation states of only a part of the operation components (e.g., only the information for identifying a pressed button).

The photographing device 30 includes at least one camera. For example, the photographing device 30 includes an image pickup element such as a CCD image sensor or a CMOS image sensor, and records an image picked up by the image pickup element as digital data. The image may be a still image or a moving image picked up continuously at a predetermined frame rate. In this embodiment, a description is given of a case in which the first photographing device 30A and the second photographing device 30B have the same configuration, but the configurations may be different from each other.

For example, the photographing device 30 includes a communication interface for wired communication or wireless communication. The photographing device 30 is connected to the wireless operation device 20 in a wired or wireless manner, and transmits an image to the wireless operation device 20. Any communication protocol can be applied as the communication itself, and for example, a scheme such as Ethernet (trademark), USB, wireless LAN, Bluetooth (trademark), iBeacon (trademark), or Wi-Fi Direct (trademark) may be applied.

For example, the photographing device 30 is arranged near the operator operating the wireless operation device 20. In this embodiment, the photographing device 30 is arranged on a helmet of the operator, and picks up an image in a direction in which the operator faces. The photographing device 30 may be arranged on eyeglasses of the operator, or may be arranged on a head-mounted display of the operator. Further, for example, the photographing device 30 may directly be mounted on a body of the operator, or may be integral with the wireless operation device 20. In other cases, for example, the photographing device 30 may be arranged on the ground, or may be arranged on a vehicle such as a car or a motorcycle.

The hardware configurations of the unmanned aerial vehicle 10, the wireless operation device 20, and the photographing device 30 are not limited to the example of FIG. 1, and various kinds of hardware can be employed. For example, the unmanned aerial vehicle 10 may include an operation device such as a touch panel or a button, or may include a display such as a liquid crystal display or an organic EL display.

Further, for example, the wireless operation device 20 includes a group of sensors such as a GPS sensor, an acceleration sensor, a gyro sensor, a radio wave detection sensor, or a sound detection sensor. In this case, the position or posture of the wireless operation device 20 may be used for giving an instruction to the unmanned aerial vehicle 10. Further, for example, the wireless operation device 20 may include a sound output device such as a speaker or an earphone jack, a light emitter, for example, an LED light, or a vibrator.

Further, for example, each of the unmanned aerial vehicle 10, the wireless operation device 20, and the photographing device 30 may include a reading device (e.g., memory card slot or optical disc drive) configured to read a computer-readable information storage medium, or may include an input/output device (e.g., USB port) for communicating to/from an external device. Further, for example, a program and data described as being stored into the respective devices may be supplied via the reading device or input/output device, or may be supplied via a network.

2. Outline of Unmanned Aerial Vehicle Control System

Figure 2:
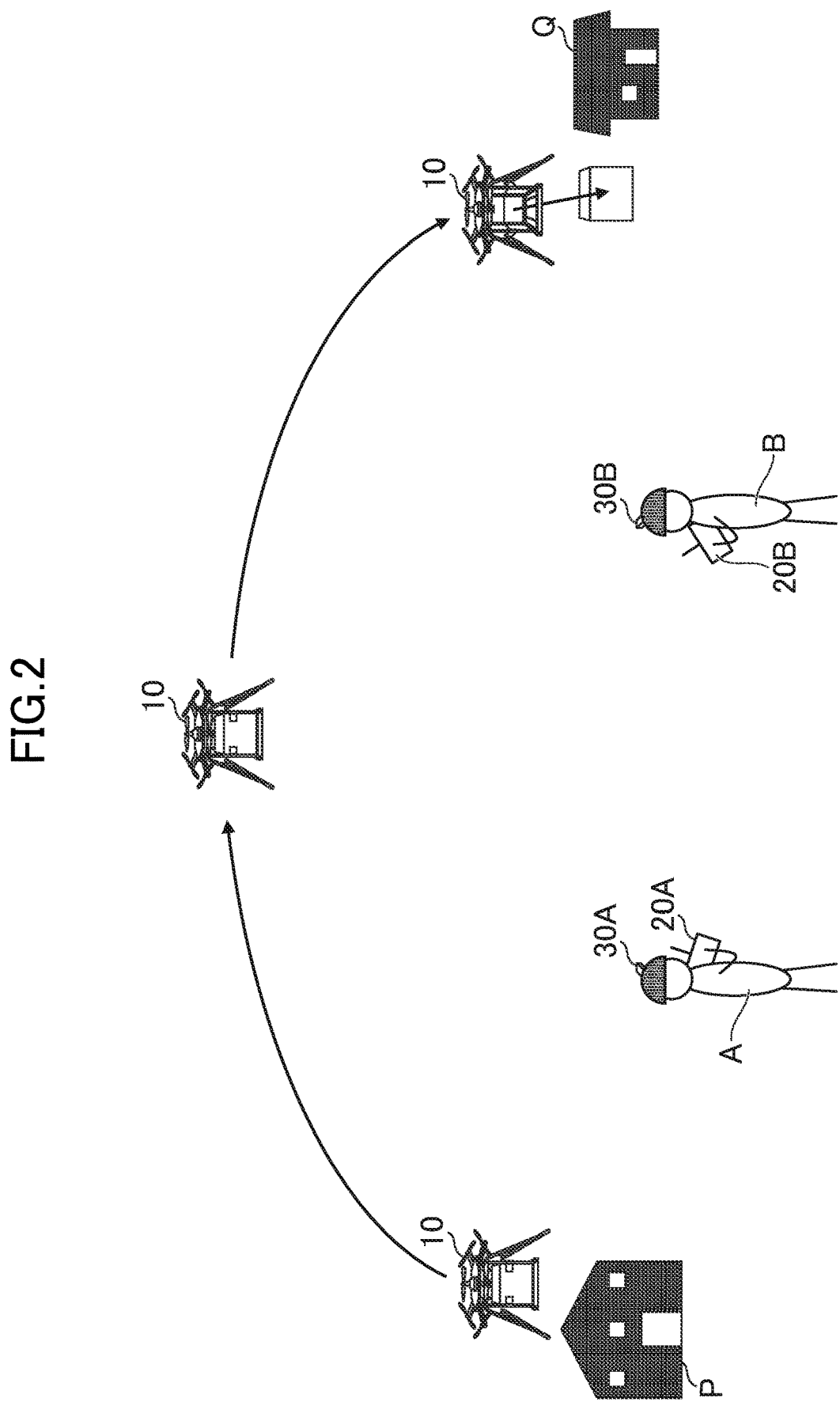
FIG. 2 is a diagram for illustrating a situation in which an unmanned aerial vehicle is flying.

FIG. 2 is a diagram for illustrating a situation in which the unmanned aerial vehicle 10 is flying. As illustrated in FIG. 2, for example, the unmanned aerial vehicle 10 carries a package from a departure location P to a target location Q. In this embodiment, the unmanned aerial vehicle 10 flies under a state of being able to communicate to/from the wireless operation device 20 operated by at least one operator in a range capable of being visually recognized by the operator.

In the example of FIG. 2, two operators A and B are deployed between the departure location P and the target location Q. Those two operators are responsible for operating the unmanned aerial vehicle 10 in a distributed manner. For example, an operator A is in charge of flying the unmanned aerial vehicle 10 near the departure location P by operating the wireless operation device 20A. Further, for example, an operator B is in charge of flying the unmanned aerial vehicle 10 near the target location Q by operating the wireless operation device 20B. The number of operators is not limited to two, and may be three or more. The number of prepared wireless operation devices 20 may be determined depending on the number of operators.

The unmanned aerial vehicle 10 can fly between the departure location P and the target location Q in any flight mode. For example, the unmanned aerial vehicle 10 flies in any one of an autonomous flight mode, in which the unmanned aerial vehicle 10 flies autonomously in a predetermined path, and a manual flight mode, in which the unmanned aerial vehicle 10 flies based on a direction and speed specified by the operator. For example, the operator may operate the wireless operation device 20 to switch between flight modes. The unmanned aerial vehicle 10 may fly under a state in which the operator does not visually recognize the unmanned aerial vehicle 10, but in this embodiment, the unmanned aerial vehicle 10 flies under a state in which the operator visually recognizes the unmanned aerial vehicle 10 in principle. Thus, the unmanned aerial vehicle 10 flies under a state in which the operator visually recognizes the unmanned aerial vehicle 10 even in the autonomous flight mode.

For example, when the unmanned aerial vehicle 10, which has loaded a package at the departure location P, becomes able to communicate to/from the first wireless operation device 20A via the first wireless communicator 130A, the unmanned aerial vehicle 10 takes off to start to fly to the target location Q. Immediately after the departure, the unmanned aerial vehicle 10 is under control of the first wireless operation device 20A and can be operated by the first operator A. That is, the operation authority is given to the first wireless operation device 20A. The first operator A may visually recognize the unmanned aerial vehicle 10 at the original place without particularly moving from the place, or may move so as to follow the unmanned aerial vehicle 10. This point holds true also for the second operator B.

When the unmanned aerial vehicle 10 has flown toward the target location Q for a certain distance, the unmanned aerial vehicle 10 enters a communication range of the second wireless operation device 20B, and becomes able to communicate to/from the second wireless operation device 20B via the second wireless communicator 130B. In this case, the unmanned aerial vehicle 10 can communicate to/from the first wireless operation device 20A and the second wireless operation device 20B simultaneously. However, at this point in time, the first wireless operation device 20A holds the operation authority, and thus the unmanned aerial vehicle 10 flies based on an instruction from the first operator A, and ignores an instruction from the second operator B.

For example, when the second operator B presses a switching instruction button on the second wireless operation device 20B under a state in which the first wireless operation device 20A holds the operation authority, the operation authority can be transferred to the second wireless operation device 20B. That is, when the second operator B presses a switching instruction button on the second wireless operation device 20B, it is possible to switch from a state in which the unmanned aerial vehicle 10 is under control of the first wireless operation device 20A to a state in which the unmanned aerial vehicle 10 is under control of the second wireless operation device 20B.

In this respect, even when the unmanned aerial vehicle 10 enters the communication range of the second wireless operation device 20B, for example, there may be an obstacle between the unmanned aerial vehicle 10 and the second wireless operation device 20B, or the second operator B may be looking away so that the second operator B does not visually recognize the unmanned aerial vehicle 10. In this case, when the second operator B erroneously presses the switching instruction button, the operation authority is transferred even though the second operator B does not visually recognize the unmanned aerial vehicle 10. Thus, the stability of flying by the unmanned aerial vehicle 10 may not be ensured.

In view of the above, the unmanned aerial vehicle control system 1 according to this embodiment determines whether or not the second operator B visually recognizes the unmanned aerial vehicle 10 based on an image picked up by the second photographing device 30B. For example, when the unmanned aerial vehicle 10 enters the communication range of the second wireless operation device 20B, the unmanned aerial vehicle 10 outputs a predetermined pattern of light from the light emitter 14. The second wireless operation device 20B analyzes the image picked up by the second photographing device 30B, and determines whether or not the predetermined pattern of light is detected, to thereby determine whether or not the second operator B visually recognizes the unmanned aerial vehicle 10.

Figure 3:
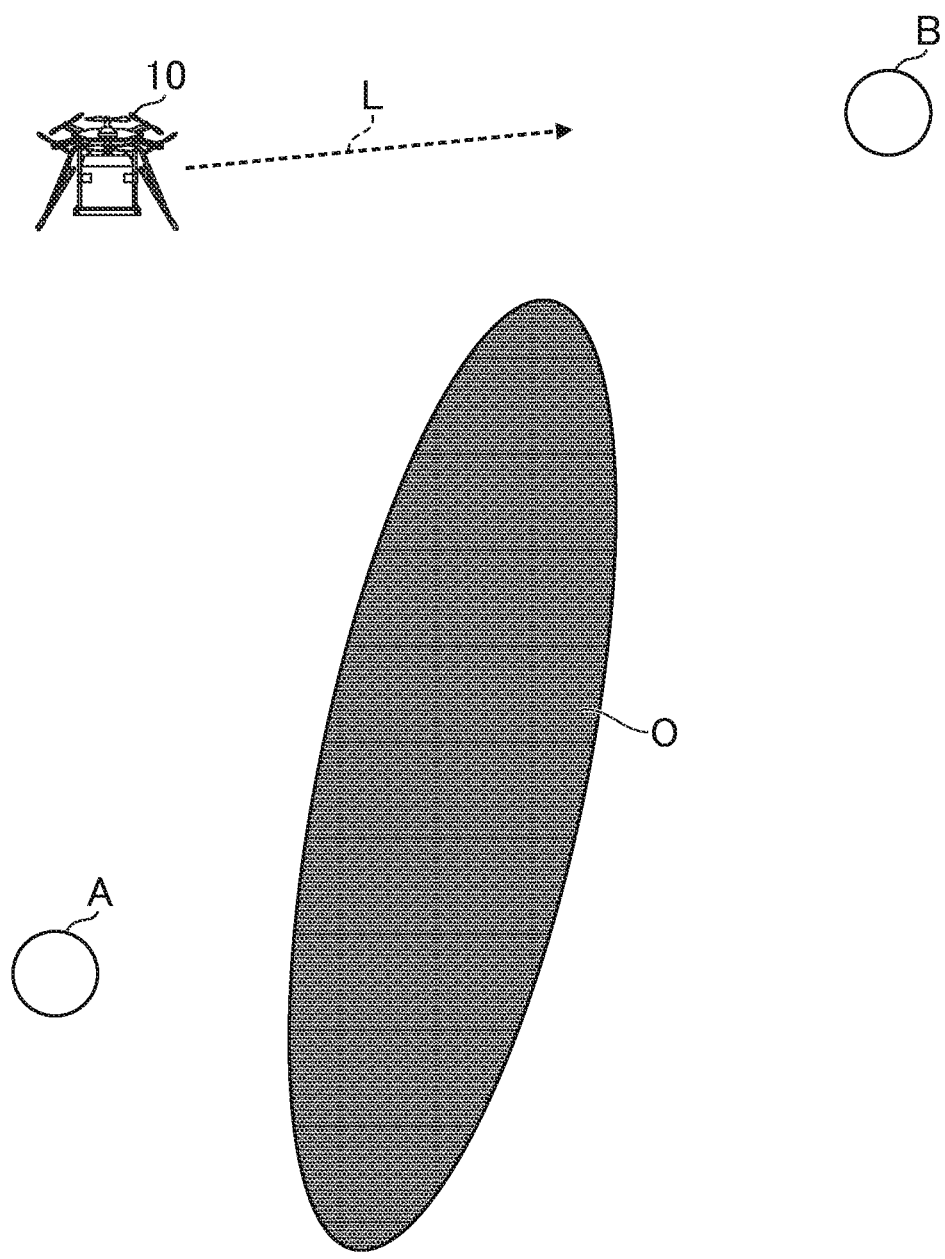
FIG. 3 is a diagram for illustrating a case in which a second operator visually recognizes the unmanned aerial vehicle.

FIG. 3 is a diagram for illustrating a case in which the second operator B visually recognizes the unmanned aerial vehicle 10. As illustrated in FIG. 3, when an obstacle O such as a building or a tree is not located between the second operator B and the unmanned aerial vehicle 10, light L emitted by the unmanned aerial vehicle 10 reaches the second operator B. Thus, as long as the second operator B faces the unmanned aerial vehicle 10, the second photographing device 30B can photograph the light L.

The second photographing device 30B continuously picks up an image, and transmits the image to the second wireless operation device 20B. The second wireless operation device 20B analyzes the image acquired from the second photographing device 30B, and determines whether or not the predetermined pattern of light is detected. When the second wireless operation device 20B has detected the predetermined pattern of light, the second wireless operation device 20B enables the switching instruction button. When the switching instruction button is pressed, the second wireless operation device 20B transmits, to the unmanned aerial vehicle 10, instruction information indicating the fact that the switching instruction button is pressed.

When the unmanned aerial vehicle 10 receives the instruction information, the unmanned aerial vehicle 10 transfers the operation authority to the second wireless operation device 20B. When the operation authority is transferred to the second wireless operation device 20B, the second operator B can operate the unmanned aerial vehicle 10, and the unmanned aerial vehicle 10 is put under control of the second wireless operation device 20B. That is, instruction information from the second wireless operation device 20B is enabled, and the unmanned aerial vehicle 10 flies based on an instruction from the second operator B, and ignores an instruction from the first operator A.

After that, the second operator B operates the unmanned aerial vehicle 10 to cause the unmanned aerial vehicle 10 to arrive at the target location Q. When the unmanned aerial vehicle 10 has arrived at the target location Q, the unmanned aerial vehicle 10 puts the package. The landing and putting of the package may be operated by the second operator B, or may automatically be performed by the unmanned aerial vehicle 10.

As described above, when the second operator B visually recognizes the unmanned aerial vehicle 10, the switching instruction button of the second wireless operation device 20B is enabled. On the contrary, when the second operator B does not visually recognize the unmanned aerial vehicle 10, the switching instruction button of the second wireless operation device 20B is disabled. Thus, even when the second operator B erroneously presses the switching instruction button, the operation authority is not transferred to the second wireless operation device 20B.

Figure 4:
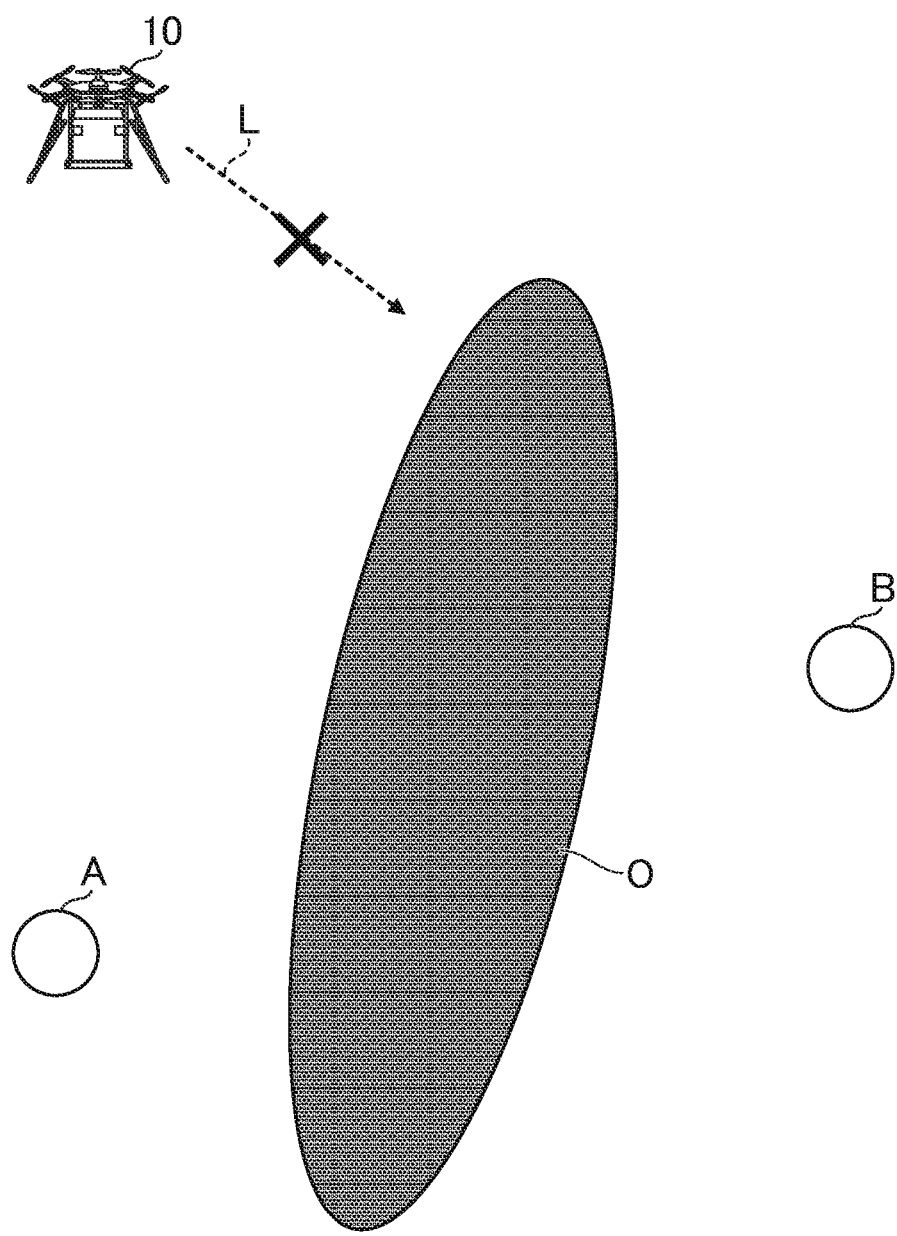
FIG. 4 is a diagram for illustrating a case in which the second operator does not visually recognize the unmanned aerial vehicle.

FIG. 4 is a diagram for illustrating a case in which the second operator B does not visually recognize the unmanned aerial vehicle 10. As illustrated in FIG. 4, when the obstacle O is located between the second operator B and the unmanned aerial vehicle 10, light emitted by the unmanned aerial vehicle 10 does not reach the second operator B. Thus, the second photographing device 30B cannot photograph the light. In this case, the switching instruction button of the second wireless operation device 20B is not enabled. When at least one of the second operator B or the unmanned aerial vehicle 10 moves and the second operator B visually recognize s the unmanned aerial vehicle 10, the switching instruction button of the second wireless operation device 20B is enabled.

When the unmanned aerial vehicle 10 puts the package at the target location Q and then returns to the departure location P, the second operator B may operate the unmanned aerial vehicle 10 fora certain period of time, and then the operation authority may be transferred to the first operator A. In this case, processing similar to that for transferring the operation authority to the second operator B is executed. That is, the first wireless operation device 20A analyzes an image acquired from the first photographing device 30A, and determines whether or not the predetermined pattern of light is detected. The first wireless operation device 20A enables the switching instruction button when the predetermined pattern of light is detected. After that, when the first operator A presses the switching instruction button, the operation authority is transferred to the first wireless operation device 20A. The unmanned aerial vehicle 10 is put under control of the first wireless operation device 20A until the unmanned aerial vehicle 10 arrives at the departure location P.

As described above, the unmanned aerial vehicle control system 1 according to this embodiment transfers the operation authority to an operator who is to receive the operation authority on condition that the operator visually recognizes the unmanned aerial vehicle 10, to thereby ensure the stability of flying by the unmanned aerial vehicle 10. In the following, details of this technology are described.

3. Functions to be Implemented in Unmanned Aerial Vehicle Control System

Figure 5:
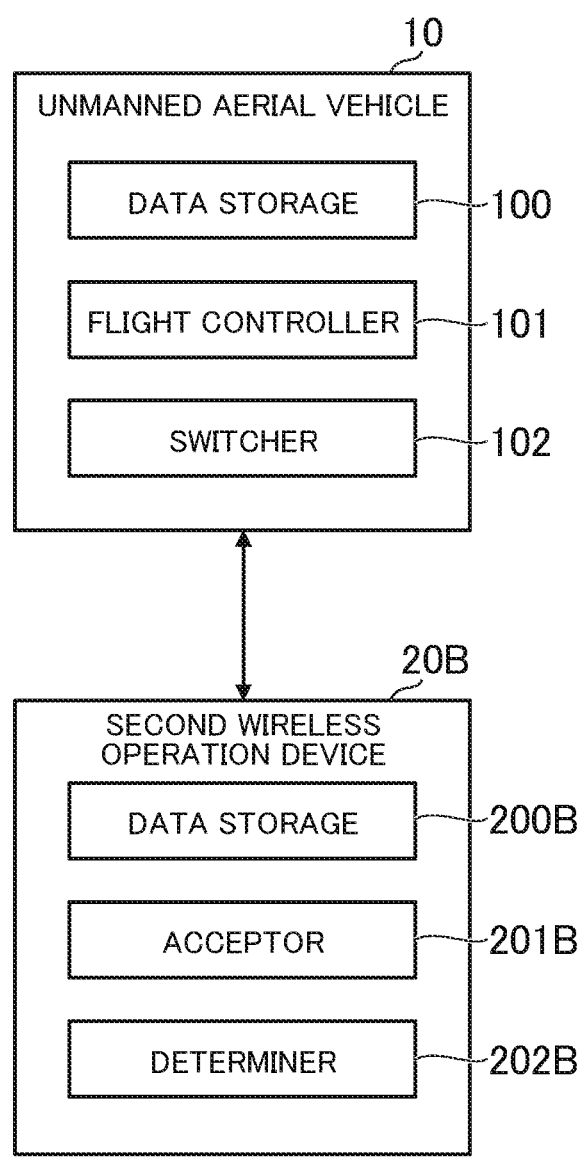
FIG. 5 is a functional block diagram for illustrating an example of functions to be implemented in the unmanned aerial vehicle control system.

FIG. 5 is a functional block diagram for illustrating an example of functions to be implemented in the unmanned aerial vehicle control system 1. Now, a description is given of functions to be implemented in the unmanned aerial vehicle 10 and functions to be implemented in the second wireless operation device 20B.

[3-1. Functions to be Implemented in Unmanned Aerial Vehicle]

As illustrated in FIG. 5, a data storage 100, a flight controller 101, and a switcher 102 are implemented by the unmanned aerial vehicle 10.

[Data Storage]

The data storage 100 is mainly implemented by the storage 12. The data storage 100 stores data for controlling the unmanned aerial vehicle 10. For example, the data storage 100 stores operation authority data and light emission pattern data.

FIG. 6 is a table for showing an example of data storage of the operation authority data. As shown in FIG. 6, the operation authority data is data for identifying the operation authority. In other words, the operation authority data is, for example, data for identifying the wireless operation device 20 holding the operation authority or data for identifying the wireless communicator 130 communicating to/from the wireless operation device 20 holding the operation authority.

For example, in the operation authority data, identification information on the wireless communicator 130 and an operation authority flag are associated with each other. The identification information on the wireless communicator 130 is only required to be information enabling identification of the wireless communicator 130, and is, for example, the name, individual identification number, or MAC address of the wireless communicator 130.

The operation authority flag is information for identifying whether or not the operation authority is held, and means, for example, that the operation authority is held when the operation authority flag is on (has a value of 1) and means that the operation authority is not held when the operation authority flag is off (has a value of 0). In this embodiment, the operation authority is not given to the plurality of wireless operation devices 20 at the same time, and thus the operation authority flag of any one of the wireless communicators 130 is on.

In the example of data storage of FIG. 6, the operation authority flag of the first wireless communicator 130A is on, and the operation authority flag of the second wireless communicator 130B is off, and thus the first wireless operation device 20A communicating to/from the first wireless communicator 130A holds the operation authority. Under this state, for example, when the operation authority is transferred to the second wireless operation device 20B, the operation authority flag of the second wireless communicator 130B is set on, and the operation authority flag of the first wireless communicator 130A is set off.

FIG. 7 is a table for showing an example of data storage of the light emission pattern data. As shown in FIG. 7, the light emission pattern data indicates a light emission pattern of the light emitter 14. The light emission pattern indicates how light is to be emitted to convey existence of the unmanned aerial vehicle 10, and indicates at least one of the color of light or the timings of light emission and light extinction. The light emission pattern may indicate only the color of light, only the timings of light emission and light extinction, or both thereof.

For example, the light emission pattern data indicates a time (period) during which the light emitter 14 emits light or extinguishes light. Further, the light emission pattern data indicates the color of light at the time during which the light emitter 14 emits light. In the example of data storage of FIG. 7, "emit red light for 0.5 seconds", "extinguish light for 0.5 seconds", "emit blue light for 0.5 seconds", "extinguish light for 0.5 seconds", "emit green light for 0.5 seconds", and "extinguish light for 0.5 seconds" are indicated as the light emission pattern. In the light emission pattern of FIG. 7, three seconds are set as one cycle. The light emitter 14 may emit light repeatedly in the light emission pattern indicated by the light emission pattern data, or may emit light only once in the light emission pattern.

Data to be stored in the data storage 100 is not limited to the above-mentioned example. The data storage 100 may store data for controlling the unmanned aerial vehicle 10. For example, the data storage 100 may store data indicating a flight path in the case of flight in the autonomous flight mode, or may store positional information on the departure location P and the target location Q.

[Flight Controller]

The flight controller 101 is mainly implemented by the controller 11. The flight controller 101 controls flying by the unmanned aerial vehicle 10 based on an instruction from the operator. That is, the flight controller 101 receives instruction information transmitted from the wireless operation device 20, and controls flying by the unmanned aerial vehicle 10 based on the instruction information.

In this embodiment, the first wireless operation device 20A holds the operation authority immediately after the unmanned aerial vehicle 10 has departed from the departure location P, and thus the flight controller 101 controls flying by the unmanned aerial vehicle 10 based on an instruction from the first operator A. That is, the flight controller 101 receives instruction information transmitted from the first wireless operation device 20A, and controls flying by the unmanned aerial vehicle 10 based on the instruction information.

The term "controlling flight" refers to determining at least one of the movement direction or movement speed of the unmanned aerial vehicle 10. In other words, the term. "controlling flight" refers to determining electric power to be supplied to the motor of the unmanned aerial vehicle 10, determining the number of revolutions of a propeller of the unmanned aerial vehicle 10, or determining the flight mode of the unmanned aerial vehicle 10. Alternatively, the "controlling flight" may correspond to flying the unmanned aerial vehicle 10 toward the target location Q, causing the unmanned aerial vehicle 10 to hover at the current location, or causing the unmanned aerial vehicle 10 to return to a predetermined location (e.g., departure location P or position of operator).

For example, when a flight mode can be specified on the wireless operation device 20, the flight controller 101 controls flight based on the flight mode indicated by the instruction information. For example, when the flight controller 101 causes the unmanned aerial vehicle 10 to fly in the autonomous flight mode, the flight controller 101 controls flight based on a predetermined flight path. Various kinds of autonomous flight algorithms can be applied as the autonomous flight itself, and for example, the flight controller 101 identifies the current position of the unmanned aerial vehicle 10 based on positional information detected by the GPS sensor 16A, and controls flight so that the unmanned aerial vehicle 10 moves on the flight path.

Further, for example, when the flight controller 101 causes the unmanned aerial vehicle 10 to fly in the autonomous flight mode, the flight controller 101 may control flight based on an image picked up by the photographing device 15. When the flight controller 101 controls flight based on the image, the flight controller 101 flies the unmanned aerial vehicle 10 such that the unmanned aerial vehicle 10 approaches a specific subject contained in the image, or flies the unmanned aerial vehicle 10 such that the unmanned aerial vehicle 10 maintains a predetermined positional relationship with a specific subject contained in the image.

Further, for example, when the flight controller 101 causes the unmanned aerial vehicle 10 to fly in the manual flight mode, the flight controller 101 determines a movement direction based on instruction information. When the instruction information indicates an operation state of the operation device 24, the flight controller 101 determines the movement direction based on the operation state. On the contrary, when the wireless operation device 20 determines the movement direction based on the operation state of the operation device 24, and the instruction information indicates the movement direction, the flight controller 101 refers to the instruction information to determine the movement direction.

For example, when the unmanned aerial vehicle 10 moves in the horizontal direction, the unmanned aerial vehicle 10 moves in a direction in which the number of revolutions of the propeller is relatively small, and thus the flight controller 101 determines the number of revolutions of each propeller so that the number of revolutions of a propeller on the movement-direction side becomes smaller than the number of revolutions of a propeller on the opposite side. Further, for example, when the unmanned aerial vehicle 10 moves in a vertical direction, the flight controller 101 causes the number of revolutions of the propeller to become larger than a threshold value so that the unmanned aerial vehicle 10 moves in an upward direction, or causes the number of revolutions of the propeller to become smaller than a threshold value so that the unmanned aerial vehicle 10 moves in a downward direction.

Further, for example, when the flight controller 101 causes the unmanned aerial vehicle 10 to fly in the manual flight mode, the flight controller 101 determines a movement speed based on instruction information. When the instruction information indicates an operation state of the operation device 24, the flight controller 101 determines the movement speed based on the operation state. On the contrary, when the wireless operation device 20 determines the movement speed based on the operation state of the operation device 24, and the instruction information indicates the movement speed, the flight controller 101 refers to the instruction information to determine the movement speed. For example, as the instruction information indicates a higher movement speed, the flight controller 101 increases the number of revolutions of each propeller, whereas as the instruction information indicates a lower movement speed, the flight controller 101 decreases the number of revolutions of each propeller.

[Switcher]

The switcher 102 is mainly implemented by the controller 11. The switcher 102 switches from a state in which the unmanned aerial vehicle 10 flies in accordance with an instruction from one operator to a state in which the unmanned aerial vehicle 10 flies in accordance with an instruction from another operator.

In this embodiment, the first operator A operates the unmanned aerial vehicle 10 immediately after the unmanned aerial vehicle 10 has departed from the departure location P, and thus, based on the result of determination obtained by a determiner 202B, the switcher 102 switches from a first state, in which the unmanned aerial vehicle 10 flies in accordance with an instruction from the first operator A, to a second state, in which the unmanned aerial vehicle 10 flies in accordance with an instruction from the second operator B.

The first state is a state in which instruction information from the first wireless operation device 20A is effective, a state in which flight is controlled based on the instruction information, a state in which the instruction information influences the result of flight, a state in which the instruction information serves as an argument (input) of the flight control algorithm, a state in which the first wireless operation device 20A holds the operation authority, or a state in which an operation authority flag of the first wireless communicator 130A communicating to/from the first wireless operation device 20A is on.

The second state is a state in which instruction information from the second wireless operation device 20B is effective, a state in which flight is controlled based on the instruction information, a state in which the instruction information influences the result of flight, a state in which the instruction information serves as an argument (input) of the flight control algorithm, a state in which the second wireless operation device 20B holds the operation authority, or a state in which an operation authority flag of the second wireless communicator 130B communicating to/from the second wireless operation device 20B is on.

The term "switch" refers to changing the method of controlling the unmanned aerial vehicle 10. In other words, the term "switch" refers to changing information (information source) to be referred to in order to control flight. For example, the term "switch" corresponds to changing from a state in which instruction information from the first wireless operation device 20A is referred to, to a state in which instruction information from the second wireless operation device 20B is referred to. In this embodiment, switching is performed by changing the value of the operation authority flag of the operation authority data.

The switcher 102 acquires a result of determination obtained by the determiner 202B, and switches from the first state to the second state when the determination result is a predetermined result. In this embodiment, the switcher 102 restricts switching from the first state to the second state when it is not determined that the second operator B visually recognizes the unmanned aerial vehicle 10, or switches from the first state to the second state when it is determined that the second operator B visually recognizes the unmanned aerial vehicle 10. That is, the switcher 102 allows switching from the first state to the second state when it is determined that the second operator B visually recognizes the unmanned aerial vehicle 10.

The term "restrict" refers to prohibiting switching to the second state, or suppressing switching to the second state.

The term "prohibit" refers to preventing switching to the second state. In other words, the term "prohibit" refers to a state in which instruction information from the second wireless operation device 20B is completely ineffective, a state in which flight is not controlled based on the instruction information, a state in which the instruction information does not influence the result of flight, a state in which the instruction information is not an argument (input) of the flight control algorithm, or a state in which the second wireless operation device 20B does not hold the operation authority.

The term "suppress" refers to mixing the first state with the second state so as to prevent completely switching to the second state. In other words, the term "suppress" refers to a state in which instruction information from the second wireless operation device 20B is not completely effective, a state in which flight is not controlled completely based on the instruction information, a state in which the instruction information does not influence the result of flight completely, a state in which the instruction information is an argument (input) of the flight control algorithm but the coefficient is small, or a state in which the second wireless operation device 20B holds the operation authority shared by the first wireless operation device 20A.

The first state may be switched to the second state without particularly issuing a switching instruction. However, in this embodiment, the second wireless operation device 20B accepts a switching instruction, and thus the switcher 102 switches from the first state to the second state based on the result of determination obtained by the determiner 202B when the switching instruction is accepted.

The phrase "when a switching instruction is accepted" refers to a time point at which a switching instruction is accepted or a time point a predetermined period before or after the time point. The determiner 202B described later may execute determination processing only when a switching instruction is accepted, or may execute the determination processing regularly. When the determiner 202B executes the determination processing regularly, the switcher 102 switches from the first state to the second state based on the result of determination obtained when a switching instruction is accepted.

For example, the switcher 102 switches from the first state to the second state when the result of determination obtained by the determiner 202B is a predetermined result and a switching instruction is accepted. In other words, the switcher 102 switches from the first state to the second state not only based on the result of determination obtained by the determiner 202B but also on condition that a switching instruction is accepted.

[3-2. Functions to be implemented in Second Wireless Operation Device]

As illustrated in FIG. 5, a data storage 200B, an acceptor 201B, and the determiner 202B are implemented in the second wireless operation device 20B.

[Data Storage]

The data storage 200B is mainly implemented by the storage 22B. The data storage 200B stores data for transmitting instruction information to the unmanned aerial vehicle 10. Herein, a description is given of a case in which the data storage 200B stores light emission pattern data. The light emission pattern data is similar to that of FIG. 7, and thus a description thereof is omitted.

Data to be stored by the data storage 200B is not limited to the above-mentioned example. The data storage 200B may store a template image when the template image is required for the processing by the determiner 202B.

[Acceptor]

The acceptor 201B is mainly implemented by the controller 21B. The acceptor 201B accepts various kinds of instructions from the second operator B based on a detection signal from the operation device 24B. For example, the acceptor 201B accepts a switching instruction from the second operator B. The acceptor 201B may accept other instructions, and for example, may accept instructions such as an instruction of the movement direction, an instruction of the movement speed, an instruction to hover, an instruction to return to a predetermined location, or an instruction of the flight mode.

The switching instruction is an instruction for requesting the operation authority, and is an instruction for switching the operation authority. In other words, the switching instruction is an instruction for switching from the first state to the second state. The switching instruction may be an operation of any type as long as the switching instruction is an operation that can be performed on the operation device 24B. For example, the switching instruction is an operation on a specific operation component of the operation device 24B, and in this embodiment, the switching instruction is to press the switching instruction button.

[Determiner]

The determiner 202B is mainly implemented by the controller 21B. The determiner 202B determines whether or not the second operator B visually recognizes the unmanned aerial vehicle 10 based on a predetermined determination method.

The predetermined determination method is only required to be a determination method determined in advance, and in this embodiment, a description is given of a method of using an image. However, as in modification examples of the present invention described later, a method of using a radio wave or a sound wave may be employed, or a method of using positional information may be employed. For example, the predetermined determination method may be a method of using at least one of an image, a radio wave, a sound wave, or positional information.

The term "visually recognize" refers to visual recognition. In other words, the term "visually recognize" refers to the fact that the unmanned aerial vehicle 10 is within the field of view, or the operator knows existence of the unmanned aerial vehicle 10. The phrase "the second operator B visually recognizes the unmanned aerial vehicle 10" does not only have a meaning of the second operator B actually visually recognizing the unmanned aerial vehicle 10, but also has a meaning of the second operator B being estimated to visually recognize the unmanned aerial vehicle 10.

In this embodiment, the determiner 202B determines whether or not the second operator B visually recognizes the unmanned aerial vehicle 10 based on an image picked up by the photographing device 30B of the second operator B.

The photographing device 30B of the operator is a photographing device near the operator. In other words, the photographing device 30B of the operator is a photographing device for determining whether or not the operator visually recognizes the unmanned aerial vehicle 10. For example, a photographing device worn by the operator, a photographing device grasped by the operator, a photographing device inside a terminal of the operator, or a photographing device connected to the terminal of the operator is the photographing device of the operator. In other cases, for example, the photographing device of the operator may be arranged on the ground, or may be arranged in a vehicle such as a car or a motorcycle.

The phrase "near the operator" refers to a range within a predetermined distance (e.g., 0 centimeters to 10 centimeters) from the operator. The term "wear" refers to adherence to the body of the operator or adherence to an object (e.g., helmet, eyeglasses, head-mounted display, or clothes) put on by the operator. The term "grasp" refers to holding by a hand. The terminal of the operator is a terminal to be operated by the operator, and may be, for example, the wireless operation device 20 or other terminals. Other terminals include, for example, a smartphone (cell phone), a tablet terminal, or a personal computer.

The orientation of the photographing device of the operator matches or substantially matches the orientation of the operator. The term "orientation of the photographing device" refers to a photographing direction (line-of-sight direction), and is a direction of a focal point as viewed from the photographing device. The term "orientation of the operator" refers to the orientation of eyes, the face, the head, or the body. The term. "match" refers to the fact that the orientations are completely the same, or do not have any deviation (intersection angle is 0°). The term "substantially match" refers to the fact that the orientations can be regarded as the same, or the deviation is minute (e.g., the intersection angle is equal to or larger than 0° and smaller than 30°).

In this embodiment, a description is given of the second photographing device 30B as an example of the photographing device of the operator. Thus, the determiner 202B determines whether or not the second operator B visually recognizes the unmanned aerial vehicle 10 based on an image picked up by the second photographing device 30B. The determiner 202B may perform determination based on one image (e.g., still image) or may perform determination based on a plurality of continuously picked-up images. The plurality of images may be images included in a moving image, or may be a plurality of repeatedly picked-up still images that are not particularly included in a moving image.

In this embodiment, the unmanned aerial vehicle 10 outputs a predetermined pattern of light, and thus the determiner 202B determines whether or not the predetermined pattern of light is detected based on an image, to thereby determine whether or not the second operator B visually recognizes the unmanned aerial vehicle 10.

For example, the determiner 202B refers to a pixel value of each pixel within an image to determine whether or not there is a region of the color of light indicated by the light emission pattern data. When it is determined that there is such a region, the determiner 202B monitors a change in color of the region. The determiner 202B determines whether or not the change in color of the region is a change in color of light indicated by the light emission pattern data. When it is determined that the change in color of the region is a change in color of light indicated by the light emission pattern data, the determiner 202B determines that the second operator B visually recognizes the unmanned aerial vehicle 10.

When the light emitter 14 does not emit a predetermined pattern of light but emits monochromatic light continuously, the determiner 202B may determine whether or not the monochromatic light is detected based on an image, to thereby determine whether or not the second operator B visually recognizes the unmanned aerial vehicle 10. In this case, the determiner 202B refers to a pixel value of each pixel within the image to determine whether or not there is a region of the color of light. When it is determined that there is a region of the color of light, the determiner 202B determines that the second operator B visually recognizes the unmanned aerial vehicle 10.

Further, the method of using an image is not limited to the method of using light. For example, the determiner 202B may determine whether or not the unmanned aerial vehicle 10 is photographed based on an image. In this case, the determiner 202B determines whether or not the unmanned aerial vehicle 10 is photographed based on an object detection algorithm. Various kinds of techniques can be applied as the object detection algorithm, and for example, a pattern matching method may be used, or a machine learning algorithm may be used.

In other cases, for example, the unmanned aerial vehicle 10 may be caused to perform a predetermined pattern of motion, and the determiner 202B may determine whether or not a predetermined pattern of motion is detected based on an image. This motion may be any type of motion, and for example, may be a motion of turning so as to draw a circle, or may be a motion of moving left or right in zigzags. The determiner 202B keeps track of an object detected from the image based on the object detection algorithm, and determines whether or not the unmanned aerial vehicle 10 is performing a predetermined pattern of motion.

4. Processing to be Executed in Unmanned Aerial Vehicle Control System

Figure 8:
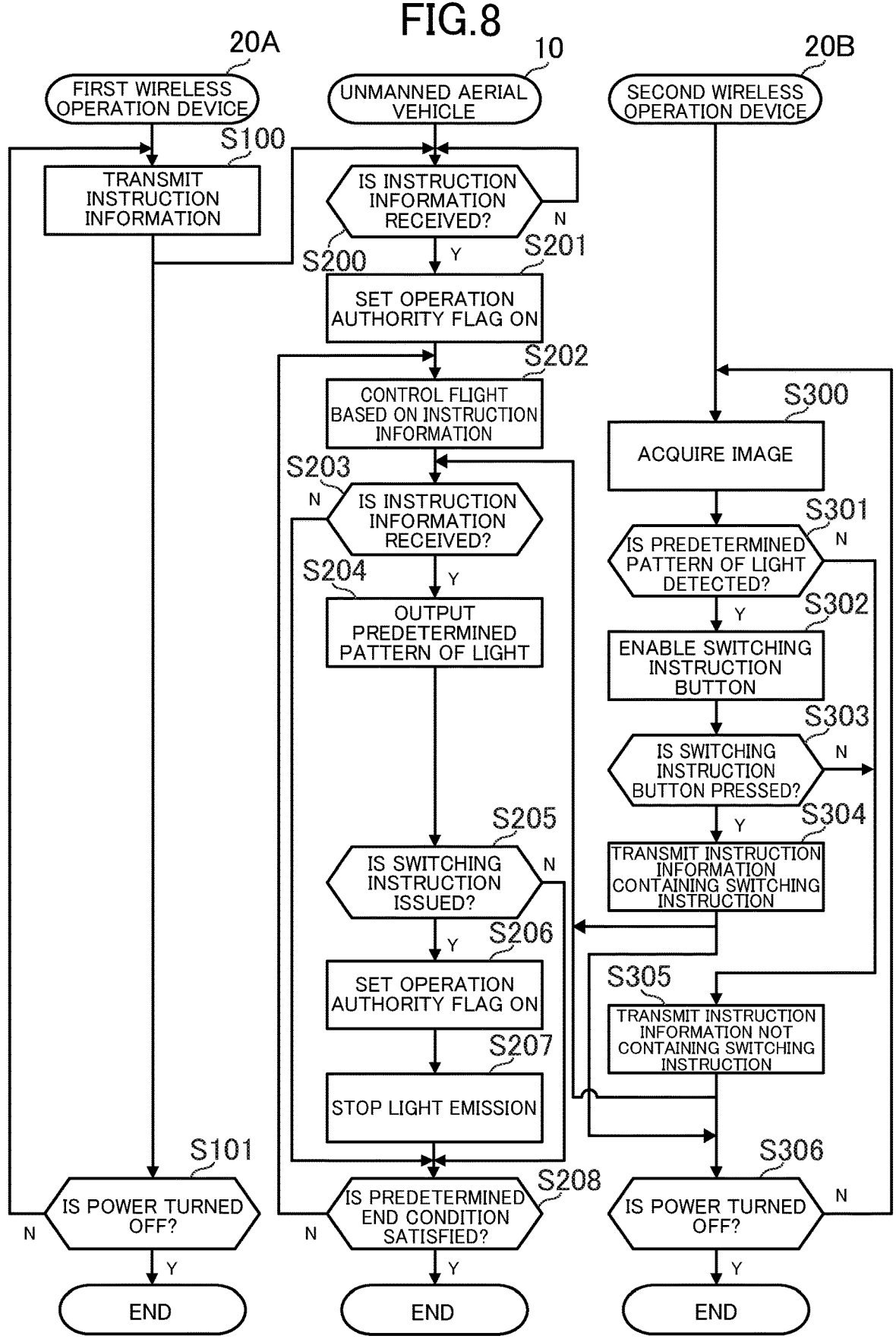
FIG. 8 is a flowchart for illustrating an example of processing to be executed in the unmanned aerial vehicle control system.

FIG. 8 is a flowchart for illustrating an example of processing to be executed in the unmanned aerial vehicle control system 1. In this embodiment, a description is given of a case in which the unmanned aerial vehicle 10, the first wireless operation device 20A, and the second wireless operation device 20B execute processing illustrated in FIG. 8. The processing illustrated in FIG. 8 is executed by the controller 11 operating in accordance with a program stored in the storage 12, the controller 21A operating in accordance with a program stored in the storage 22A, and the controller 21B operating in accordance with a program stored in the storage 22B.

The following processing is an example of processing to be implemented by functional blocks illustrated in FIG. 5. Further, it is assumed that the operation authority flags are all set off as initial values of the operation authority data. Further, it is assumed that the second photographing device 30B has picked up an image continuously, and transmitted the images to the second wireless operation device 20B. Further, it is assumed that the switching instruction button of the second wireless operation device 20B is disabled in advance.

As illustrated in FIG. 8, first, the controller 21A of the first wireless operation device 20A transmits instruction information to the unmanned aerial vehicle 10 based on a detection signal from the operation device 24A (Step S100). In Step S100, the controller 21A generates instruction information indicating the operation state of each operation component of the operation device 24A, and transmits the instruction information via the communicator 23A.

The controller 21 determines whether or not the power of the first wireless operation device 20A is turned off (Step S101). When it is determined that the power of the first wireless operation device 20A is turned off (Step S101: Y), the processing is finished. On the contrary, when it is not determined that the power of the first wireless operation device 20A is turned off (Step S101: N), the processing returns to the processing of Step S100. That is, the first wireless operation device 20A repeatedly transmits instruction information until the power is turned off.

The controller 11 of the unmanned aerial vehicle 10 determines whether or not instruction information is received from the wireless operation device 20 via any one of the wireless communicators 130 (Step S200). The instruction information is transmitted in a predetermined format, and thus, in Step S200, the controller 11 determines whether or not information having the format is received. In this embodiment, the first operator A is near the departure location P, and thus the controller 11 determines whether or not instruction information is received from the first wireless operation device 20A.

When it is not determined that instruction information is received via anyone of the wireless communicators 130 (Step S200: N), the processing returns to the processing of Step S200 again. In this case, the unmanned aerial vehicle 10 can communicate to/from none of the wireless operation devices 20, and thus the unmanned aerial vehicle 10 does not start to fly toward the target location Q.

On the contrary, when it is determined that instruction information is received via anyone of the wireless communicators 130 (Step S200: Y), the controller 11 sets the operation authority flag of the wireless communicator 130 on (Step S201). In Step S201, the controller 11 sets on the operation authority flag of a record storing identification information on a wireless communicator 130 that has received the instruction information, within the operation authority data. With this, the instruction information received via the wireless communicator 130 becomes effective, and the operation authority is given to the wireless operation device 20 transmitting the instruction information. In this embodiment, instruction information is received from the first wireless operation device 20A, and thus the operation authority flag of the first wireless communicator 130A is set on.

The controller 11 controls flying by the unmanned aerial vehicle 10 based on the instruction information received via the wireless communicator 130 whose operation authority flag is on (Step S202). In Step S202, the controller 11 controls the unmanned aerial vehicle 10 based on a value of each item included in the instruction information. For example, when the instruction information indicates the autonomous flight mode, the unmanned aerial vehicle 10 flies in the autonomous flight mode. In this case, the controller 11 determines output to each motor so that the positional information detected by the GPS sensor 15 follows a predetermined path. The information indicating the path in the autonomous flight mode may be stored in the storage 12 in advance, or may be acquired from another computer via the communicator 13.

The controller 11 determines whether or not instruction information is received via the wireless communicator 130 whose operation authority flag is off (Step S203). In Step S203, similarly to Step S200, the controller 11 determines whether or not information having a predetermined format has been received. In this embodiment, the controller 11 determines whether or not instruction information is received from the second wireless operation device 20B via the second wireless communicator 130B.

When it is not determined that instruction information is received via the wireless communicator 130 whose operation authority flag is off (Step S203: N), the processing advances to processing of Step S208. In this case, the state of the first wireless operation device 20A holding the operation authority is maintained.

On the contrary, when it is determined that instruction information is received via the wireless communicator 130 whose operation authority flag is off (Step S203: Y), the controller 11 outputs a predetermined pattern of light from the light emitter 14 based on the light emission pattern data (Step S204). In Step S204, the controller 11 identifies a timing to emit light, a color of light to be emitted, and a timing to extinguish light, based on the light emission pattern data, to thereby control electric power to be supplied to the light emitter 14.

The controller 21B of the second wireless operation device 20B acquires an image from the second photographing device 30B (Step S300). The second wireless operation device 20B and the second photographing device 30B are connected in advance, and in Step 300, the second wireless operation device 20B acquires an image picked up by the second photographing device 30B. For example, the second photographing device 30B repeatedly executes photographing processing based on a predetermined frame rate, and transmits images to the second wireless operation device 20B.

The controller 21B determines whether or not the predetermined pattern of light is detected based on the image acquired in Step S300 (Step S301). In Step S301, the controller 21B determines whether or not the predetermined color of light is detected in the image based on the light emission pattern data stored in the storage 22B.

When it is determined that the predetermined pattern of light is detected (Step S301: Y), the controller 21B enables the switching instruction button (Step S302). For example, a flag indicating whether or not the switching instruction button is effective is stored in advance in the storage 22B, and in Step S302, the controller 21B sets the flag on to enable the switching instruction button.

The controller 21B determines whether or not the switching instruction button is pressed based on a detection signal from the operation device 24B (Step S303). When it is determined that the switching instruction button is pressed (Step S303: Y), the controller 21 transmits instruction information containing a switching instruction to the unmanned aerial vehicle 10 (Step S304). In Step S304, the controller 21B generates instruction information indicating the fact that the switching instruction button is on, and transmits the instruction information via the communicator 23B. After Step S304 is completed, Step S203 and S306 are performed.

On the contrary, when it is not determined that the switching instruction button is pressed (Step S303: N), the controller 21B transmits instruction information not containing a switching instruction (Step S305). In Step S305, the controller 21B generates instruction information indicating the fact that the switching instruction button is off, and transmits the instruction information to the unmanned aerial vehicle 10 via the communicator 23B. After Step S305 is completed, Step S203 and S306 are performed.

The controller 21B determines whether or not the power of the second wireless operation device 20A is turned off (Step S306). When it is determined that the power source of the second wireless operation device 20B is turned off (Step S306: Y), the processing is finished. On the contrary, when it is not determined that the power of the second wireless operation device 20B is turned off (Step S306: N), the processing returns to the processing of Step S300.

The controller 11 of the unmanned aerial vehicle 10 refers to the received instruction information to determine whether or not a switching instruction for switching the operation authority is issued (Step S205). In Step S205, the controller 11 refers to the operation state of the switching instruction button indicated by the instruction information to determine whether or not a switching instruction is issued. When it is not determined that a switching instruction is issued (Step S205: N), the processing advances to the processing of Step S208 described later. In this case, the processing of Step S206 is not executed, and thus the operation authority is not transferred.

On the contrary, when it is determined that a switching instruction is issued (Step S205: Y), the controller 11 sets on the operation authority flag of the wireless communicator 130B (wireless communicator 130B having received instruction information in Step S203) communicating to/from the second wireless operation device 20B having issued a switching instruction (Step S206). In Step S206, the controller 11 changes, to on, the operation authority flag of a record within the operation authority data that stores identification information on the wireless communicator 130B that has received the instruction information, and changes, to off, the operation authority flag that has been on. With this, the instruction information received via the wireless communicator 130B becomes effective, and the instruction information that has been effective so far becomes ineffective. In this case, the operation authority is transferred from the first wireless operation device 20A to the second wireless operation device 20B.

The controller 11 stops light emission from the light emitter 14 (Step S207). In Step S207, the controller 11 cuts off electric power to the light emitter 14. The processing of Step S207 may be omitted, and the light emitter 14 may emit light continuously.

The controller 11 determines whether or not a predetermined end condition is satisfied (Step S208). The end condition is only required to be a condition defined to end the processing, and may be, for example, a condition that the unmanned aerial vehicle 10 has arrived at the target location Q or the departure location P, or may be a condition that the unmanned aerial vehicle 10 has landed. When it is not determined that the end condition is satisfied (Step S208: N), the processing returns to the processing of Step S202. When it is determined that the end condition is satisfied (Step S208: Y), the processing is finished.

With the unmanned aerial vehicle control system 1 described above, it is determined whether or not the second operator B visually recognizes the unmanned aerial vehicle 10, and the operation authority is switched under a state in which the second operator B visually recognizes the unmanned aerial vehicle 10, to thereby be able to ensure the stability of the unmanned aerial vehicle 10. That is, it is possible to prevent such a situation that the operation authority is transferred even when the second operator B does not visually recognize the unmanned aerial vehicle 10 and the second operator B cannot cope with the instability of the unmanned aerial vehicle 10.

Further, switching from the first state to the second state is restricted when it is not determined that the second operator B visually recognizes the unmanned aerial vehicle 10, and the first state is switched to the second state when it is determined that the second operator B visually recognizes the unmanned aerial vehicle 10, to thereby be able to ensure the stability of the unmanned aerial vehicle 10 more reliably.

Further, the first state is switched to the second state when the second operator B has accepted a switching instruction, to thereby be able to ensure the stability of the unmanned aerial vehicle 10 more reliably. That is, the operation authority is transferred on the assumption that the second operator B has exhibited an intention to receive the operation authority. Thus, the second operator B can be prepared for the reception of the operation authority in advance, and it is possible to more reliably prevent such a situation that the second operator B cannot cope with the instability of the unmanned aerial vehicle 10.

Further, it is determined whether or not the second operator B visually recognizes the unmanned aerial vehicle 10 based on an image, to thereby be able to ensure the stability of the unmanned aerial vehicle 10 more reliably. Further, the photographing device 15 of the unmanned aerial vehicle 10 can be omitted when the photographing device 20 is provided on the second operator B side, to thereby reduce the weight of the unmanned aerial vehicle 10.

Further, it is determined whether or not the second operator B visually recognizes the unmanned aerial vehicle 10 by determining whether or not a predetermined pattern of light is detected, to thereby be able to ensure the stability of the unmanned aerial vehicle 10 more reliably. Further, when the unmanned aerial vehicle 10 does not emit a predetermined pattern of light continuously, but emits light when a signal is received from the second wireless operation device 20B, it is possible to prevent excessive light emission, to thereby suppress power consumption of the unmanned aerial vehicle 10.

5. Modification Examples

The present invention is not limited to the embodiment described above, and can be modified suitably without departing from the spirit of the present invention.

Figure 9:
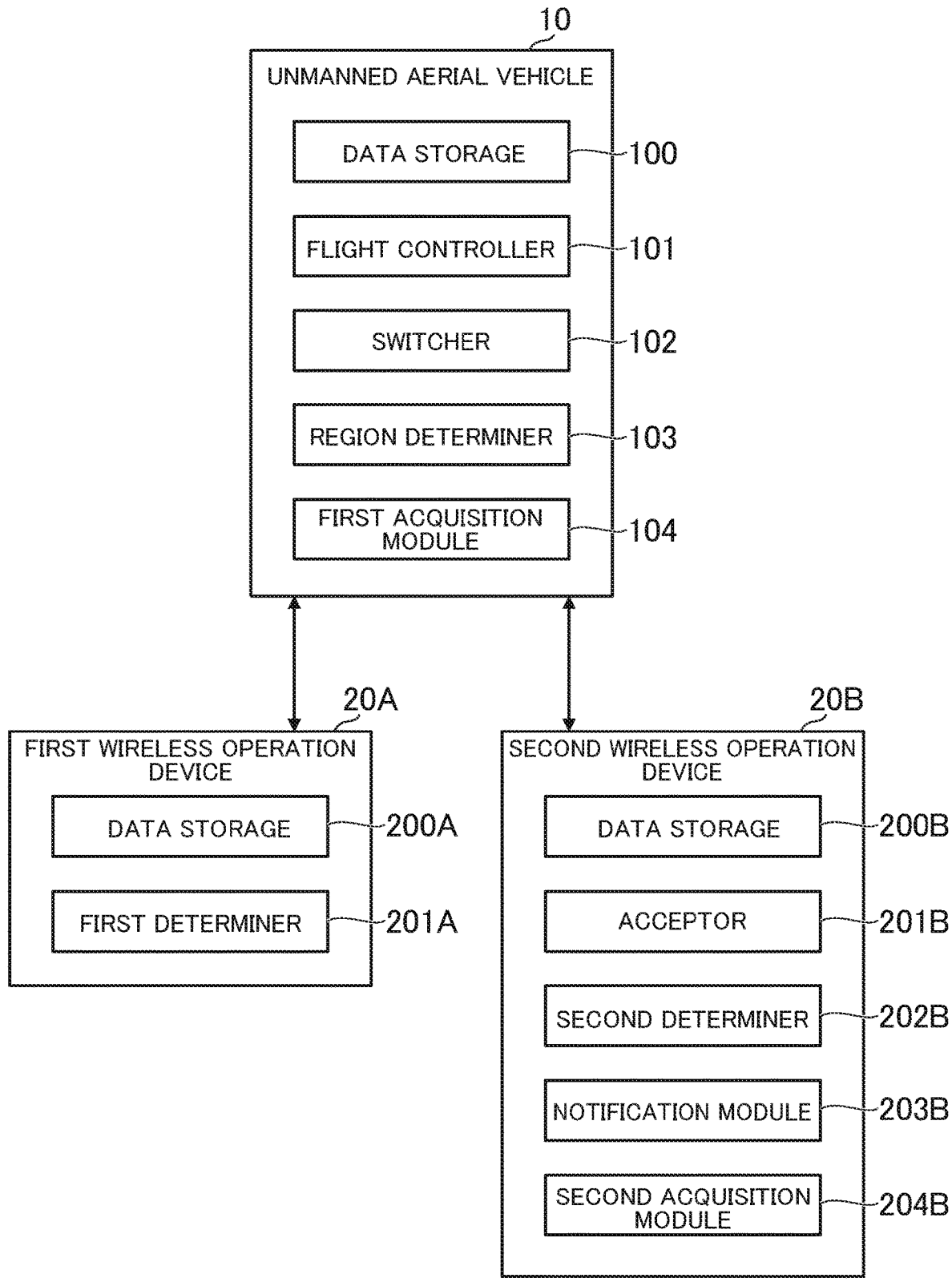
FIG. 9 is a functional block diagram in modification examples of the present invention.

FIG. 9 is a functional block diagram in the modification examples of the present invention. As illustrated in FIG. 9, in the modification examples described later, a region determiner 103, a first acquisition module 104, a data storage 200A, a first determiner 201A, a notification module 203B, and a second acquisition module 204B are implemented in addition to the functions described in the embodiment. In the modification examples described later, the determiner 202B described in the embodiment is referred to as "second determiner 202B". Further, the data storage 200A is mainly implemented by the storage 22A, and may be similar to the data storage 200B.

In Modification Example (1), when the first wireless operation device 20A holds the operation authority, it may be determined whether or not the first operator A visually recognizes the unmanned aerial vehicle 10. In this case, when it is determined that the first operator A does not visually recognize the unmanned aerial vehicle 10, the unmanned aerial vehicle 10 may be caused to return to a predetermined location, or the unmanned aerial vehicle 10 may be caused to hover or land. Further, the operation authority may be transferred from the first wireless operation device 20A to the second wireless operation device 20B on condition that both of the first operator A and the second operator B visually recognize the unmanned aerial vehicle 10.

In the unmanned aerial vehicle control system 1 according to Modification Example (1) of the present invention, the first determiner 201A is implemented by the first wireless operation device 20A. The first determiner 201A is mainly implemented by the controller 21A. The determiner 201A determines whether or not the first operator A visually recognizes the unmanned aerial vehicle 10 based on a predetermined determination method.

The meaning of the "predetermined determination method" is as described in the embodiment. The determination method to be performed by the first determiner 201A may be similar to that performed by the second determiner 202B. The processing of the first determiner 201A may be said to be similar to the processing of the second determiner 202B by replacing, in the description of the second determiner 202B, the second operator B and the second photographing device 30B with the first operator A and the first photographing device 30A, respectively.

In this modification example, the first determiner 201A determines whether or not the first operator A visually recognizes the unmanned aerial vehicle 10 based on an image picked up by the photographing device of the first operator A. The meaning of the "photographing device of the operator" is as described in the embodiment. The method of determining visual recognition by using an image may be similar to the method described for the second determiner 202B. For example, the first determiner 201A determines whether or not a predetermined pattern of light is detected based on an image, to thereby determine whether or not the first operator A visually recognizes the unmanned aerial vehicle 10.

The switcher 102 switches from the first state to the second state based further on the result of determination obtained by the first determiner 201A. That is, the switcher 102 switches from the first state to the second state based on the result of determination obtained by the first determiner 201A and the result of determination obtained by the second determiner 202B. The switcher 102 switches from the first state to the second state when the result of determination obtained by the first determiner 201A and the result of determination obtained by the second determiner 202B are predetermined results.

For example, when it is not determined that the first operator A visually recognizes the unmanned aerial vehicle 10, or when it is not determined that the second operator B visually recognizes the unmanned aerial vehicle 10, the switcher 102 restricts switching from the first state to the second state. That is, the switcher 102 restricts switching from the first state to the second state when it is not determined that both of the first operator A and the second operator B visually recognize the unmanned aerial vehicle 10.

Further, for example, when it is determined that the first operator A visually recognizes the unmanned aerial vehicle 10 and the second operator B visually recognizes the unmanned aerial vehicle 10, the switcher 102 switches from the first state to the second state. That is, the switcher 102 switches from the first state to the second state when it is determined that both of the first operator A and the second operator B visually recognize the unmanned aerial vehicle 10.

With Modification Example (1), it is determined whether or not the first operator A visually recognizes the unmanned aerial vehicle 10 and the operation authority is switched under a state in which the first operator A visually recognizes the unmanned aerial vehicle 10, to thereby be able to ensure the stability of the unmanned aerial vehicle 10 more reliably. That is, it is possible to prevent such a situation that no one visually recognizes the unmanned aerial vehicle 10 before switching of the operation authority and thus no one can cope with the instability of the unmanned aerial vehicle 10.

Further, when it is determined that the first operator A visually recognizes the unmanned aerial vehicle 10 and the second operator B visually recognizes the unmanned aerial vehicle 10, the first state is switched to the second state, to thereby be able to ensure the stability of the unmanned aerial vehicle 10 more reliably.

In Modification Example (2), for example, even when the first operator A does not visually recognize the unmanned aerial vehicle 10, the operation authority may automatically be transferred from the first wireless operation device 20A to the second wireless operation device 20B as long as the second operator B visually recognizes the unmanned aerial vehicle 10.

Figure 10:
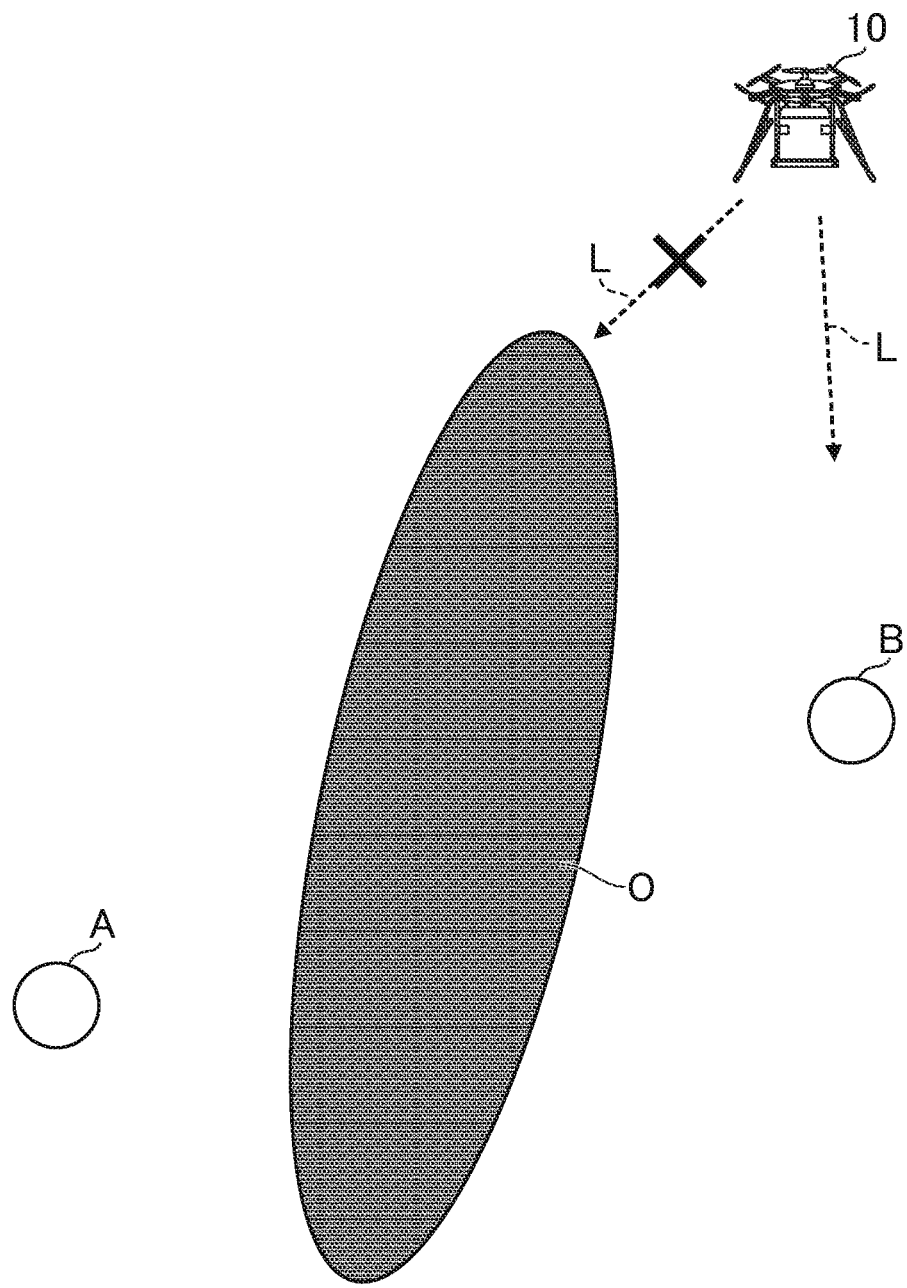
FIG. 10 is a diagram for illustrating a case in which a first operator can no longer visually recognize the unmanned aerial vehicle and the second operator visually recognizes the unmanned aerial vehicle.

FIG. 10 is a diagram for illustrating a case in which the first operator A can no longer visually recognize the unmanned aerial vehicle 10 and the second operator B visually recognizes the unmanned aerial vehicle 10. As illustrated in FIG. 10, when an obstacle O is located between the first operator A and the unmanned aerial vehicle 10, the light L emitted by the unmanned aerial vehicle 10 does not reach the first operator A, and thus the first photographing device 30A cannot photograph the light L.

Meanwhile, the obstacle O is not located between the second operator B and the unmanned aerial vehicle 10, and thus the light L emitted by the unmanned aerial vehicle 10 reaches the second operator B. As a result, the second photographing device 30B can photograph the light L when the second operator B faces the unmanned aerial vehicle 10. In this modification example, under the state of FIG. 10, the operation authority is transferred from the first wireless operation device 20A to the second wireless operation device 20B without causing the unmanned aerial vehicle 10 to return, for example.

When it is not determined that the first operator A visually recognizes the unmanned aerial vehicle 10 and it is determined that the second operator B visually recognizes the unmanned aerial vehicle 10, the switcher 102 in Modification Example (2) of the present invention switches from the first state to the second state. Similarly to the embodiment, a switching instruction may be issued. However, in this modification example, a description is given of a case in which the first state is switched to the second state without particularly issuing a switching instruction. Thus, the switcher 102 automatically switches from the first state to the second state when it is not determined that the first operator A visually recognizes the unmanned aerial vehicle 10 and it is determined that the second operator B visually recognizes the unmanned aerial vehicle 10.

With Modification Example (2), when it is not determined that the first operator A visually recognizes the unmanned aerial vehicle 10 and it is determined that the second operator B visually recognizes the unmanned aerial vehicle 10, the first state is switched to the second state, to thereby be able to ensure the stability of the unmanned aerial vehicle 10 more reliably. That is, even when the first operator A cannot visually recognize the unmanned aerial vehicle 10 and the first operator A cannot cope with the instability of the unmanned aerial vehicle 10, it is possible to enable the second operator B to cope with the instability.

In Modification Example (3), for example, when the operation authority is to be transferred from the first wireless operation device 20A to the second wireless operation device 20B, a predetermined notification may be issued by the second wireless operation device 20B to enable the second operator B to recognize the transfer of the operation authority.

In the unmanned aerial vehicle control system 1 according to Modification Example (3) of the present invention, the notification module 203B is implemented by the second wireless operation device 20B. The notification module 203B is mainly implemented by the controller 21. The notification module 203B issues a predetermined notification to the second operator B in the case of switching from the first state to the second state.

The predetermined notification is only required to be a notification determined in advance, and may be, for example, a notification that utilizes eyesight, hearing, or touch. For example, the predetermined notification is to display a predetermined image, to cause a predetermined light emitter to emit light, to output a predetermined sound, or to cause vibration having a predetermined pattern.

The data storage 200B may store data for notification. For example, when a visual notification is issued, the notification module 203B displays a predetermined image based on image data stored in the data storage 200B. Further, for example, when an auditory notification is issued, the notification module 203B outputs a predetermined sound based on sound data stored in the data storage 200B. Further, for example, when a tactile notification is issued, the notification module 203B causes vibration having a predetermined pattern based on vibration pattern data stored in the data storage 200B.

With Modification Example (3), when the first state is switched to the second state, a predetermined notification is issued to the second operator B, to thereby enable the second operator B to be prepared in advance to ensure the stability of the unmanned aerial vehicle 10 more reliably.

In Modification Example (4), for example, a region for transferring the operation authority from the first wireless operation device 20A to the second wireless operation device 20B may not be particularly determined, or may be determined in advance. This region is a region for switching from the first state to the second state, and thus is hereinafter referred to as "switching region". In this modification example, a description is given of a case in which the switching region is determined in advance, and the operation authority is transferred at a certain location.

In the unmanned aerial vehicle control system 1 according to Modification Example (4) of the present invention, the region determiner 103 is implemented by the unmanned aerial vehicle 10. The region determiner 103 is mainly implemented by the controller 11. The region determiner 103 determines whether or not the unmanned aerial vehicle 10 is located within a predetermined switching region.

The switching region may be any region, and is a region for the second operator B to take over an operation from the first operator A. For example, the switching region is a region provided between the departure location P and the target location Q. The switching region may be set at an intermediate location between the departure location P and the target location Q, or may be set at a position closer to the departure location P or the target location Q with respect to the intermediate location.

The data storage 100 in this modification example stores data indicating the switching region. This data indicates the position of the switching region, and may indicate, for example, latitude/longitude information or coordinate information on the switching region or base station information or access point information corresponding to the switching region.

The region determiner 103 determines whether or not the unmanned aerial vehicle 10 is located within the switching region based on the positional information on the unmanned aerial vehicle 10. Various kinds of methods can be applied as the method of acquiring the positional information itself, and for example, the positional information may be latitude/longitude information or coordinate information detected by the GPS sensor 16A or may be base station information or access point information acquired by the communicator 13.

For example, when the positional information is latitude/longitude information or coordinate information, the region determiner 103 determines whether or not the latitude/longitude information or coordinate information indicating the position of the unmanned aerial vehicle 10 is included in the switching region. The region determiner 103 determines that the unmanned aerial vehicle 10 is located within the switching region when the latitude/longitude information or coordinate information is included in the switching region, or determines that the unmanned aerial vehicle 10 is not located within the switching region when the latitude/longitude information or coordinate information is not included in the switching region.

Further, for example, when the positional information is base station information or access point information, the region determiner 103 determines whether or not the base station information or access point information indicating the position of the unmanned aerial vehicle 10 and the base station information or access point information indicating the position of the switching region match each other. The region determiner 103 determines that the unmanned aerial vehicle 10 is located within the switching region when those pieces of information match each other, or determines that the unmanned aerial vehicle 10 is not located within the switching region when those pieces of information do not match each other.

The determination method to be performed by the region determiner 103 is not limited to the method involving using positional information. For example, the region determiner 103 may determine whether or not the unmanned aerial vehicle 10 is located within the switching region based on an image picked up by the photographing device 15. In this case, it is assumed that data indicating a subject within the switching region is stored in the data storage 100. The region determiner 103 determines whether or not the subject is photographed in the image. The region determiner 103 determines that the unmanned aerial vehicle 10 is located within the switching region when the subject is photographed in the image, or determines that the unmanned aerial vehicle 10 is not located within the switching region when the subject is not photographed in the image.

When it is determined that the unmanned aerial vehicle 10 is located within the switching region, the switcher 102 switches from the first state to the second state based on the result of determination obtained by the determiner.

The phrase "when it is determined that the unmanned aerial vehicle 10 is located within the switching region" refers to a time point at which the unmanned aerial vehicle 10 is determined to be located within the switching region or a time point a predetermined period before or after the time point. The second determiner 202B may execute the determination processing only when the unmanned aerial vehicle 10 is determined to be located within the switching region, or may execute the determination processing regularly. When the second determiner 202B executes the determination processing regularly, the switcher 102 switches from the first state to the second state based on the result of determination obtained when the unmanned aerial vehicle 10 is determined to be located within the switching region.

When it is determined that the unmanned aerial vehicle 10 is not located within the switching region, the unmanned aerial vehicle 10 may not cause the light emitter 14 to emit light, and when it is determined that the unmanned aerial vehicle 10 is located within the switching region, the unmanned aerial vehicle 10 may cause the light emitter 14 to emit light. That is, the unmanned aerial vehicle 10 may start to cause the light emitter 14 to emit light on condition that the unmanned aerial vehicle 10 is determined to be located within the switching region. In this manner, it is possible to reduce power consumption of the unmanned aerial vehicle 10.

With Modification Example (4), when it is determined that the unmanned aerial vehicle 10 is located within the switching region, the first state is switched to the second state, to thereby be able to switch the operation authority at a location where the operation can easily visually recognize the unmanned aerial vehicle 10 to ensure the stability of the unmanned aerial vehicle 10 more reliably.

In Modification Example (5), for example, as described in the embodiment, the method of determining whether or not the unmanned aerial vehicle 10 is visually recognized is not limited to the method involving using an image.

In Modification Example (5-1) for example, it may be determined whether or not the unmanned aerial vehicle 10 is visually recognized by using a radio wave or sound wave. However, when a radio wave or sound wave circumvents the obstacle O, the radio wave or sound wave may reach the unmanned aerial vehicle 10 even when the operator does not visually recognize the unmanned aerial vehicle 10. Thus, in this modification example, a directional radio wave or sound wave is used. The directional radio wave or sound wave is a radio wave or sound wave having a different strength depending on the direction.

Figure 11:
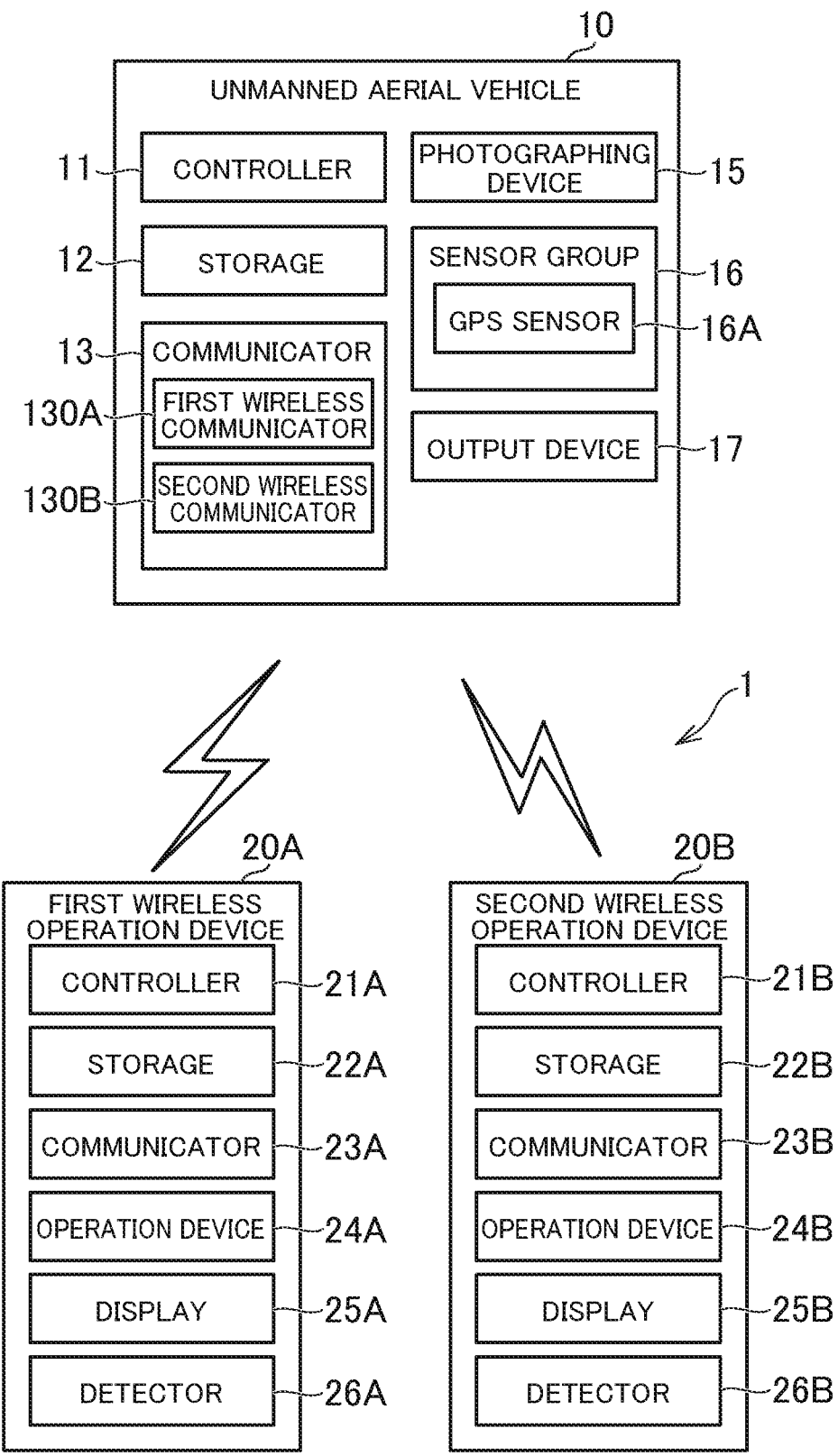
FIG. 11 is a diagram for illustrating an entire configuration of an unmanned aerial vehicle control system according to Modification Example (5-1) of the present invention. In Modification Examples (5) and (6), for reference numbers not shown in FIGS. 11-13, see the corresponding description with respect to FIG. 9.

FIG. 11 is a diagram for illustrating an entire configuration of the unmanned aerial vehicle control system 1 according to Modification Example (5-1) of the present invention. As illustrated in FIG. 11, the unmanned aerial vehicle 10 includes an output device 17. The output device 17 includes at least one of a transmission antenna configured to output a directional radio wave or a directional speaker configured to output a directional sound wave.

The output device 17 can be arranged at any position of the unmanned aerial vehicle 10, and the unmanned aerial vehicle 10 may output a radio wave or sound wave in any direction. For example, the output device 17 may be arranged in the front direction (roll-axis direction) of the unmanned aerial vehicle 10, and the unmanned aerial vehicle 10 may output a radio wave or sound wave in the front direction. Further, for example, the output device 17 may be arranged in the lateral direction (pitch-axis direction) of the unmanned aerial vehicle 10, and the unmanned aerial vehicle 10 may output a radio wave or sound wave in the lateral direction.

Further, for example, the output device 17 may be arranged in the downward direction (yaw-axis direction) of the unmanned aerial vehicle 10, and the unmanned aerial vehicle 10 may output a radio wave or sound wave in the downward direction. Further, for example, the output devices 17 may be arranged on the side surfaces of the unmanned aerial vehicle 10, and the unmanned aerial vehicle 10 may output a radio wave or sound wave toward surroundings. In this case, the unmanned aerial vehicle 10 may output a radio wave or sound wave so as to cover 360 degrees around the unmanned aerial vehicle 10, or may output a radio wave or sound wave toward only a specific range (e.g., any angle equal to or larger than 90 degrees and smaller than 360 degrees).

The wireless operation device 20 includes a detector 26. The detector 26 includes at least one of a reception antenna configured to receive a directional radio wave or a sound sensor configured to receive a directional sound wave.

In this modification example, the unmanned aerial vehicle 10 outputs a directional radio wave or sound wave. The unmanned aerial vehicle 10 may output a radio wave or sound wave regularly from the output device 17, or may start to output a radio wave or sound wave from the output device 17 when instruction information is received from the second wireless operation device 20B or the unmanned aerial vehicle 10 has reached the switching region. For example, the data storage 100 may store data indicating a radio wave pattern or a sound wave pattern. The output device 17 outputs a radio wave or sound wave having the pattern indicated by the data.

The determiner determines whether or not the second operator B visually recognizes the unmanned aerial vehicle 10 based on the radio wave or sound wave detected by the detector 26B of the second operator B.

The detector 26B of the operator is a detector near the operator. In other words, the detector 26B of the operator is a detector for determining whether or not the operator visually recognizes the unmanned aerial vehicle 10. For example, a detector worn by the operator, a detector grasped by the operator, a detector inside the terminal of the operator, or a detector connected to the terminal of the operator is the detector of the operator. In other cases, for example, the detector 26B of the operator may be arranged on the ground, or may be arranged in a vehicle such as a car or a motorcycle.

In this modification example, a description is given of the detector 26B inside the second wireless operation device 20B as an example of the detector of the operator. Thus, the second determiner 202B determines whether or not a radio wave or sound wave is detected based on a detection signal from the detector 26B.

For example, the second determiner 202B determines that a radio wave or sound wave is detected when the strength of a radio wave or sound wave detected by the detector 26B is equal to or larger than a threshold value. The second determiner 202B determines that the second operator B visually recognizes the unmanned aerial vehicle 10 when a radio wave or sound wave is detected, or determines that the second operator B does not visually recognize the unmanned aerial vehicle 10 when a radio wave or a sound wave is not detected.

Further, for example, the data storage 200B may store data indicating a radio wave pattern or a sound wave pattern. In this case, the second determiner 202B determines whether or not a radio wave or sound wave of the pattern indicated by the data is detected based on a detection signal from the detector 26B. The second determiner 202B determines that the second operator B visually recognizes the unmanned aerial vehicle 10 when a radio wave or sound wave having the pattern is detected, or determines that the second operator B does not visually recognize the unmanned aerial vehicle 10 when a radio wave or sound wave having the pattern is not detected.

With Modification Example (5-1), it is determined whether or not the second operator B visually recognizes the unmanned aerial vehicle 10 based on a directional radio wave or sound wave, to thereby be able to ensure the stability of the unmanned aerial vehicle 10 more reliably.

In Modification Example (5-2), for example, positional information may be used to determine whether or not the unmanned aerial vehicle 10 is visually recognized.

Figure 12:
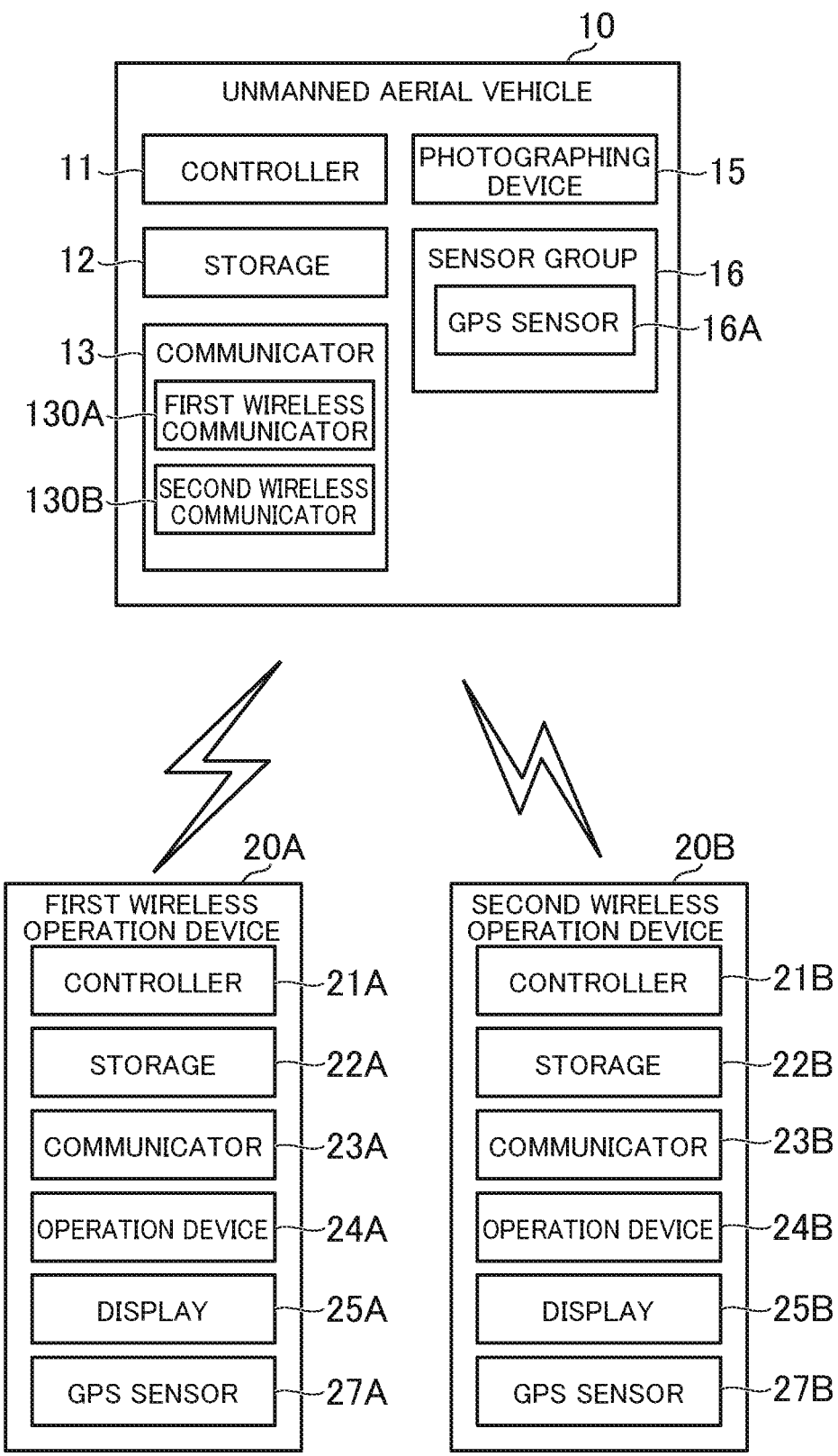
FIG. 12 is a diagram for illustrating an entire configuration of an unmanned aerial vehicle control system according to Modification Example (5-2) of the present invention.

FIG. 12 is a diagram for illustrating an entire configuration of the unmanned aerial vehicle control system 1 according to Modification Example (5-2) of the present invention. As illustrated in FIG. 12, the wireless operation device 20 includes a GPS sensor 27. The GPS sensor 27 is similar to the GPS sensor 16A, and thus a description thereof is omitted here.

In the unmanned aerial vehicle control system 1 according to Modification Example (5-2), the first acquisition module 104 is implemented by the unmanned aerial vehicle 10, and the second acquisition module 204B is implemented by the second wireless operation device 20B.

The first acquisition module 104 is mainly implemented by the controller 11. The first acquisition module 104 acquires unmanned aerial vehicle positional information on the position of the unmanned aerial vehicle 10. The unmanned aerial vehicle positional information is only required to be information capable of identifying the position of the unmanned aerial vehicle 10, and is, for example, latitude/longitude information, coordinate information, base station information, or access point information.

In this modification example, the first acquisition module 104 acquires latitude/longitude information or coordinate information detected by the GPS sensor 16A as the unmanned aerial vehicle positional information. In other cases, for example, the first acquisition module 104 may acquire base station information or access point information acquired by the communicator 13 as the unmanned aerial vehicle positional information.

The second acquisition module 204B is mainly implemented by the controller 21B. The second acquisition module 204B acquires operator positional information on the position of the second operator B. The operator positional information is only required to be information capable of identifying the position of the second operator B, and is, for example, latitude/longitude information, coordinate information, base station information, or access point information.

In this modification example, the second acquisition module 204B acquires latitude/longitude information or coordinate information detected by the GPS sensor 27B as the operator positional information. In other cases, for example, the second acquisition module 204B may acquire base station information or access point information acquired by the communicator 23B as the unmanned aerial vehicle positional information.

The second acquisition module 204B may acquire positional information detected by a terminal other than the second wireless operation device 20B as the operator positional information. For example, the second acquisition module 204B may acquire positional information detected by the terminal of the second operator B as the operator positional information. Further, for example, the second operator B may wear the GPS sensor 27B, and the second acquisition module 204B may acquire latitude/longitude information or coordinate information detected by the GPS sensor 27B worn by the second operator B as the operator positional information.

The second determiner 202B determines whether or not the second operator B visually recognizes the unmanned aerial vehicle 10 based on the operator positional information and the unmanned aerial vehicle positional information. In this description, the first acquisition module 104 is implemented by the unmanned aerial vehicle 10, and the second determiner 202B is implemented by the second wireless operation device 20B. Thus, the second determiner 202B acquires unmanned aerial vehicle positional information from the unmanned aerial vehicle 10 to execute the determination processing.

For example, the second determiner 202B determines whether or not the second operator B visually recognizes the unmanned aerial vehicle 10 based on a distance between the position indicated by the operator positional information and the position indicated by the unmanned aerial vehicle positional information. When the distance is smaller than a threshold value, the second determiner 202B determines that the second operator B visually recognizes the unmanned aerial vehicle 10, and when the distance is equal to or larger than the threshold value, the second determiner 202B determines that the second operator B does not visually recognize the unmanned aerial vehicle 10.

The determination method to be performed by the second determiner 202B is not limited to the method involving using a distance. For example, the second determiner 202B may determine whether or not each of the unmanned aerial vehicle 10 and the second wireless operation device 20B is located within the switching region. In this case, the second determiner 202B determines that the second operator B visually recognizes the unmanned aerial vehicle 10 when both of the unmanned aerial vehicle 10 and the second wireless operation device 20B are located within the switching region, and determines that the second operator B does not visually recognize the unmanned aerial vehicle 10 when at least one of the unmanned aerial vehicle 10 or the second wireless operation device 20B is not located within the switching region.

Further, for example, the data storage 200B may store map data, and the second determiner 202B may perform determination based on the map data. The map data may indicate geographic information on the position of the obstacle O. For example, the second determiner 202B determines whether or not the obstacle O is located between the position indicated by the operator positional information and the position indicated by the unmanned aerial vehicle positional information. The second determiner 202B determines that the second operator B visually recognizes the unmanned aerial vehicle 10 when the obstacle O is not located between those positions, and determines that the second operator B does not visually recognize the unmanned aerial vehicle 10 when the obstacle O is located between those positions.

Further, for example, when the positional information indicates base station information or access point information, the second determiner 202B determines whether or not base station information or access point information indicated by the operator positional information and base station information or access point information indicated by the unmanned aerial vehicle positional information match each other. The second determiner 202B determines that the second operator B visually recognizes the unmanned aerial vehicle 10 when those pieces of information match each other, or determines that the second operator B does not visually recognize the unmanned aerial vehicle 10 when those pieces of information do not match each other.

With Modification Example (5-2), it is determined whether or not the second operator B visually recognizes the unmanned aerial vehicle 10 based on the unmanned aerial vehicle positional information and the operator positional information, to thereby be able to ensure the stability of the unmanned aerial vehicle 10 more reliably.

In Modification Example (5-3), for example, when the second operator B visually recognizes the unmanned aerial vehicle 10, the second operator B may perform a predetermined operation. Then, when instruction information indicating the fact that the operation has been performed is accepted, it may be determined that the second operator B has visually recognized the unmanned aerial vehicle 10.

The second determiner 202B in this modification example determines whether or not the second operator B visually recognizes the unmanned aerial vehicle 10 based on an operation performed by the second operator B. This operation may be an operation determined in advance, or may be an operation that depends on predetermined eyesight information output from the unmanned aerial vehicle 10.

The second determiner 202B determines whether or not a predetermined operation has been performed based on a detection signal from the operation device 24B. When the predetermined operation has been performed, the second determiner 202B determines that the second operator B visually recognizes the unmanned aerial vehicle 10, and when the predetermined operation has not been performed, the second determiner 202B determines that the second operator B does not visually recognize the unmanned aerial vehicle 10.

With Modification Example (5-3), it is determined whether or not the second operator B visually recognizes the unmanned aerial vehicle 10 based on an operation performed by the second operator B, to thereby be able to ensure the stability of the unmanned aerial vehicle 10 more reliably.

In Modification Example (6), for example, in the embodiment and modification examples described above, a description has been given of a case in which the second determiner 202B (determiner 202B in the embodiment) is implemented by the second wireless operation device 20B. However, the second determiner 202B may be implemented by the unmanned aerial vehicle 10. In this case, the second determiner 202B is mainly implemented by the controller 11.

In Modification Example (6-1), the second determiner 202B may determine whether or not the second operator B visually recognizes the unmanned aerial vehicle 10 based on an image picked up by the photographing device 15 of the unmanned aerial vehicle 10. The only difference between the processing of the second determiner 202B and the processing described in the embodiment is that the processing of the second determiner 202B involves using an image picked up by the photographing device 15 of the unmanned aerial vehicle 10. The processing itself is the same as that described in the embodiment.

Figure 13:
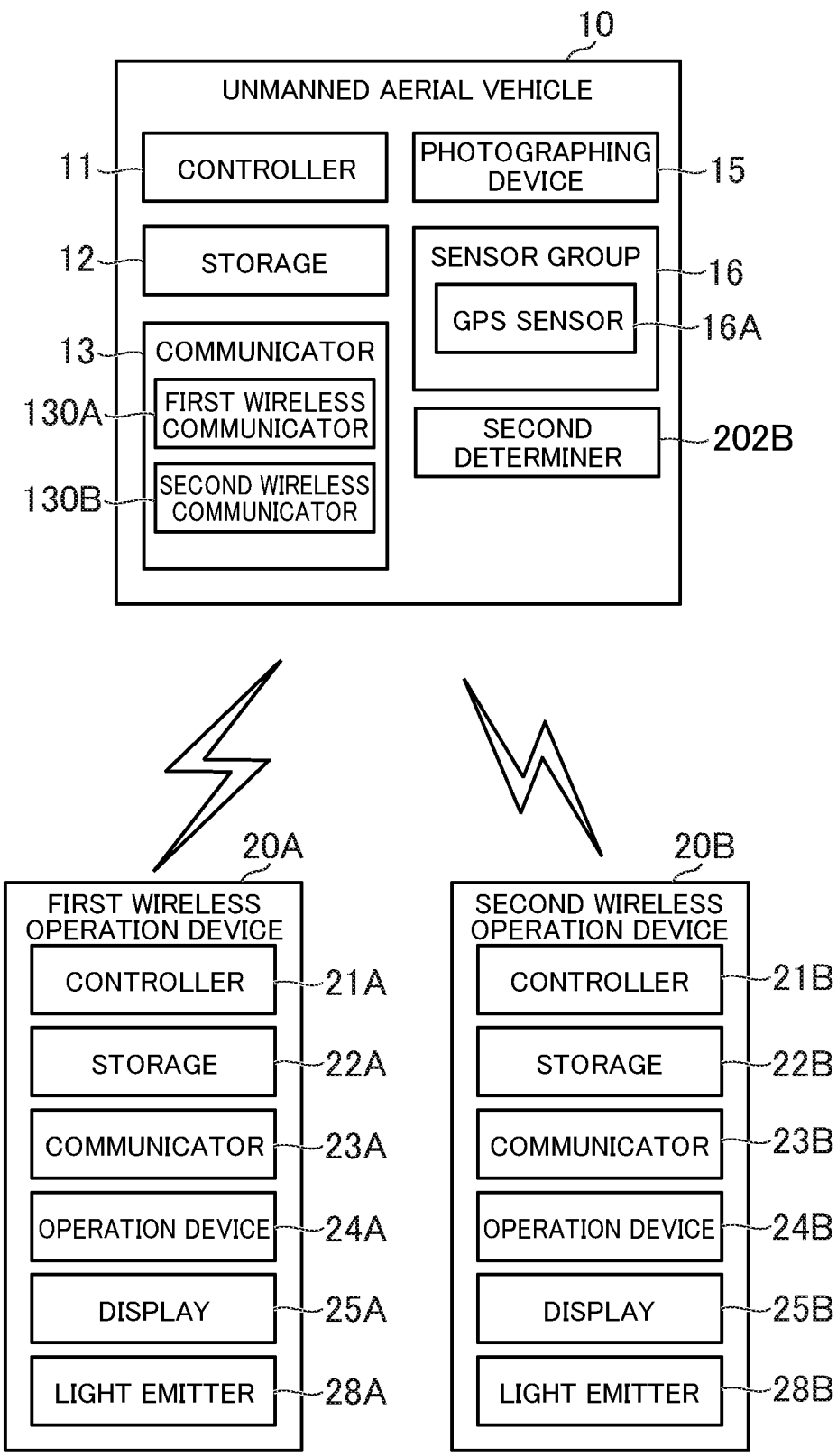
FIG. 13 is a diagram for illustrating an entire configuration of an unmanned aerial vehicle control system according to Modification Example (6-1) of the present invention.

FIG. 13 is a diagram for illustrating an entire configuration of the unmanned aerial vehicle control system 1 according to Modification Example (6-1) of the present invention. As illustrated in FIG. 13, the wireless operation device 20 includes a light emitter 28. The light emitter 28 is similar to the light emitter 14, and thus a description thereof is omitted here.

For example, the second operator B outputs a predetermined pattern of light. That is, the light emitter of the second operator B outputs a predetermined pattern of light.

The light emitter of the operator is a light emitter near the operator. In other words, the light emitter of the operator is a light emitter for determining whether or not the operator visually recognizes the unmanned aerial vehicle 10. For example, a light emitter worn by the operator, a light emitter grasped by the operator, a light emitter inside the terminal of the operator, or a light emitter connected to the terminal of the operator is the light emitter of the operator. In other cases, for example, the light emitter of the operator may be arranged on the ground, or may be arranged in a vehicle such as a car or a motorcycle. For example, the orientation of the light emitter of the operator matches or substantially matches the orientation of the operator. The term "orientation of the light emitter" refers to a direction of emitting light.

For example, the light emitter 28 emits a predetermined pattern of light based on light emission pattern data stored in the data storage 200B. The method of emitting light based on the light emission pattern data is as described in the embodiment.

The second determiner 202B determines whether or not a predetermined pattern of light is detected based on an image picked up by the photographing device 15 of the unmanned aerial vehicle 10. The determination method itself is as described in the embodiment.

The method involving using an image is not limited to the method involving using light. For example, the second determiner 202B may determine whether or not the second operator B is photographed based on an image. In this case, the second determiner 202B determines whether or not the second operator B is photographed based on an object detection algorithm or a biometric authentication algorithm. Various kinds of techniques can be applied as the biometric authentication itself, and, for example, face authentication or retina authentication may be used.

In other cases, for example, the second operator B may perform a predetermined motion, and the second determiner 202B may determine whether or not a predetermined motion is detected based on an image. This motion may be any motion, and for example, may be a motion of waving a hand, performing a predetermined gesture, or assuming a pose. The second determiner 202B determines whether or not a motion detected from the image is the predetermined motion based on a motion detection algorithm.

The second determiner 202B may determine whether or not the second operator B visually recognizes the unmanned aerial vehicle 10 based on an image picked up by the photographing device of at least one of the unmanned aerial vehicle 10 or the second operator B, or images photographed by both of the unmanned aerial vehicle 10 and the second operator B may be used. Further, at least one of the unmanned aerial vehicle 10 or the second operator B may output a predetermined pattern of light, and both of the unmanned aerial vehicle 10 and the second operator B may output a predetermined pattern of light.

In Modification Example (6-2), for example, the second operator B may output a directional radio wave or sound wave. In this case, the second determiner 202B of the unmanned aerial vehicle 10 determines whether or not a radio wave or sound wave output from the second operator B is detected. The only difference between the processing of the second determiner 202B and the processing described in the embodiment is that the processing of the second determiner 202B involves using a radio wave or sound wave output from the second operator B. The processing itself is the same as that described in the embodiment.

Figure 14:
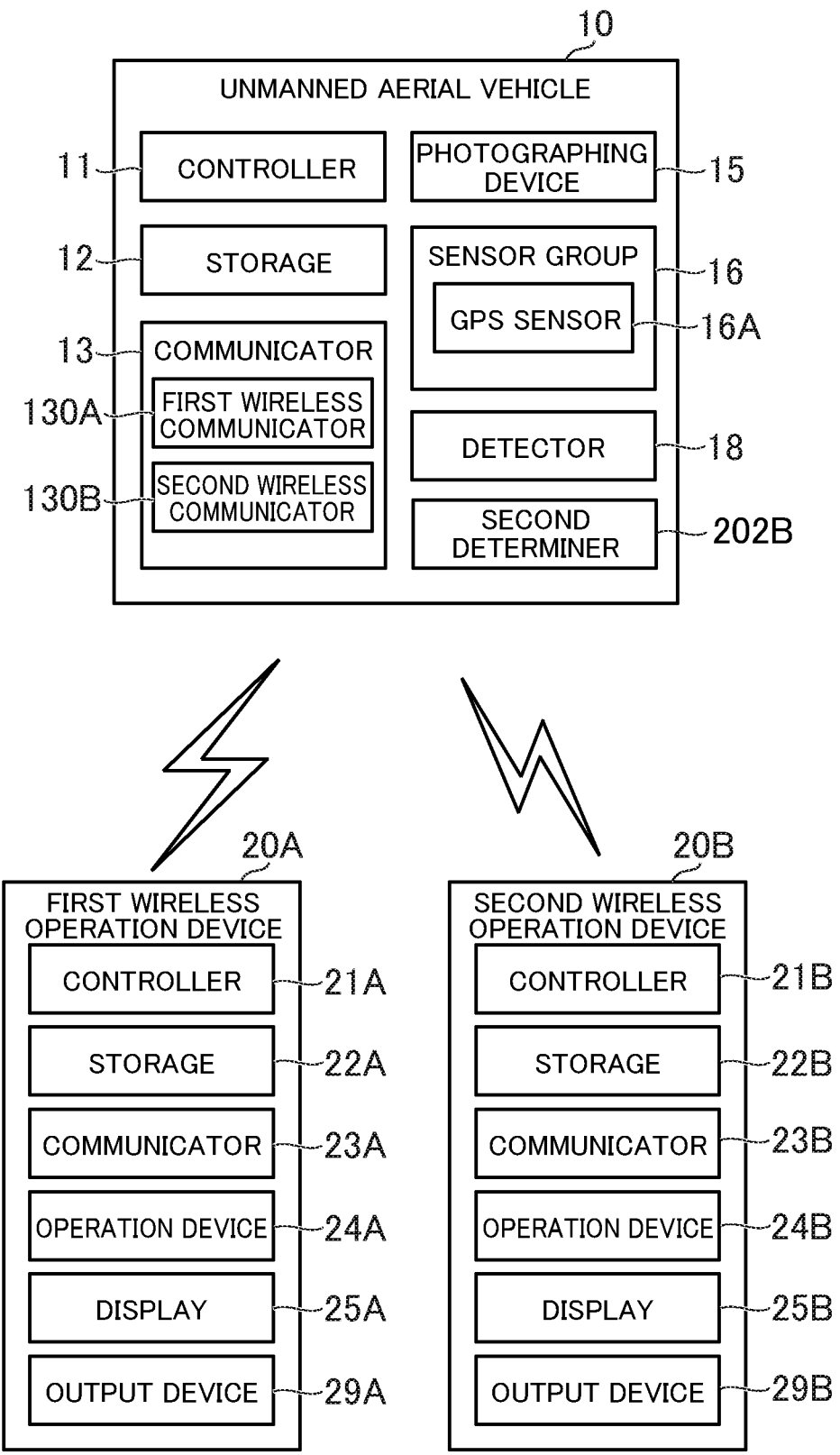
FIG. 14 is a diagram for illustrating an entire configuration of an unmanned aerial vehicle control system according to Modification Example (6-2) of the present invention.

FIG. 14 is a diagram for illustrating an entire configuration of the unmanned aerial vehicle control system 1 according to Modification Example (6-2) of the present invention. As illustrated in FIG. 14, the unmanned aerial vehicle 10 includes a detector 18. The wireless operation device 20 includes an output device 29. The detector 18 is similar to the detector 26, and the output device 29 is similar to the output device 17, and thus a description thereof is omitted here.

For example, the second operator B outputs a directional radio wave or sound wave. That is, the output device 29B of the second operator B outputs a directional radio wave or sound wave.

The output device of the operator is an output device near the operator. In other words, the output device of the operator is an output device for determining whether or not the operator visually recognizes the unmanned aerial vehicle 10. For example, an output device worn by the operator, an output device grasped by the operator, an output device inside the terminal of the operator, or an output device connected to the terminal of the operator is the output device of the operator. In other cases, for example, the output device of the operator may be arranged on the ground, or may be arranged in a vehicle such as a car or a motorcycle. For example, the orientation of the output device of the operator matches or substantially matches the orientation of the operator. The phrase "orientation of the output device" refers to a direction of outputting a radio wave or a sound wave.

At least one of the unmanned aerial vehicle 10 or the second operator B may output a directional radio wave or sound wave, and both of the unmanned aerial vehicle 10 and the second operator B may output a directional radio wave or sound wave. Further, the second determiner 202B may determine whether or not the second operator B visually recognizes the unmanned aerial vehicle 10 based on a radio wave or sound wave detected by a sensor of at least one of the unmanned aerial vehicle 10 or the second operator B, or may determine whether or not the second operator B visually recognizes the unmanned aerial vehicle 10 based on radio waves or sound waves detected by both of the sensors.

In Modification Example (7), for example, two or more of Modification Examples (1) to (6) may be combined.

Further, for example, a description has been given of a case in which one wireless communicator 130 communicates to/from one wireless operation device 20, but the wireless communicator 130 may communicate to/from a plurality of wireless operation devices 20. In this case, the wireless operation device 20 may transmit its own identification information (e.g., name or ID of wireless operation device 20) so that the unmanned aerial vehicle 10 identifies the wireless operation device 20 from which the instruction information has been acquired.

Further, for example, the unmanned aerial vehicle control system 1 may include another computer (e.g., server computer or personal computer), and the computer may execute flight control of each unmanned aerial vehicle 10. In this case, the unmanned aerial vehicle 10 and the wireless operation device 20 may communicate to/from the computer via a network, for example, the Internet. For example, the data storage 100 may be implemented by a database server in the unmanned aerial vehicle control system 1, or may be implemented by a database server outside the unmanned aerial vehicle control system 1.

Further, for example, each function described above may be implemented by any computer in the unmanned aerial vehicle control system 1, and the unmanned aerial vehicle 10, the wireless operation device 20, and other computers, for example, a server, may implement each function in a distributed manner. For example, the flight controller 101 may be implemented by the wireless operation device 20 or the server, and the unmanned aerial vehicle 10 may acquire details of control from the flight controller 101 of the wireless operation device 20 or the server to control revolution of the motor.

Further, for example, the switcher 102 may be implemented by the wireless operation device 20 or the server, and the unmanned aerial vehicle 10 may switch from the first state to the second state when the unmanned aerial vehicle 10 has received a switching instruction from the switcher 102. Further, for example, the first determiner 201A may be implemented by the unmanned aerial vehicle 10 or the server. Further, for example, the second determiner 202B may be implemented by the unmanned aerial vehicle 10 or the server.

The invention claimed is:

1. An unmanned aerial vehicle control system, comprising:
a first wireless operation device that holds operation authority;
a second wireless operation device that does not hold the operation authority, wherein the second wireless operation device includes a switching instruction operation component that is disabled in advance; and
an unmanned aerial vehicle including a controller configured to control flying by the unmanned aerial vehicle based on first instruction information transmitted by the first wireless operation device or second instruction information transmitted by the second wireless operation device;
wherein the second wireless operation device includes a controller configured to:
determine, based on a first predetermined determination method, whether or not a second operator, who operates the second wireless operation device, visually recognizes the unmanned aerial vehicle;
enable the switching instruction operation component based on the determination regarding the second operator; and
send a switching instruction, to request the operation authority to control the unmanned aerial vehicle, when the enabled switching instruction operation component is operated by the second operator;
wherein the controller of the unmanned aerial vehicle is further configured to:
determine whether or not the switching instruction is received from the second wireless operation device; and
switch or restrict switching from a first state to a second state based on the determination regarding receipt of the switching instruction, wherein switching from the first state to the second state transfers the operation authority from the first wireless operation device to the second wireless operation device, and wherein the unmanned aerial vehicle flies in accordance with the first instruction information in the first state and the unmanned aerial vehicle flies in accordance with the second instruction information in the second state.

2. The unmanned aerial vehicle control system according to claim 1, wherein the controller of the unmanned aerial vehicle is further configured to:
restrict switching from the first state to the second state when the second operator is determined to not visually recognize the unmanned aerial vehicle; and
switch from the first state to the second state when the second operator is determined to visually recognize the unmanned aerial vehicle.

3. The unmanned aerial vehicle control system according to claim 1,
wherein the first wireless operation device includes a controller configured to:
determine, based on a second predetermined determination method, whether or not the first operator, who operates the first wireless operation device, visually recognizes the unmanned aerial vehicle, and
wherein the controller of the unmanned aerial vehicle is further configured to:
switch from the first state to the second state based further on the determination regarding the first operator.

4. The unmanned aerial vehicle control system according to claim 3, wherein the controller of the unmanned aerial vehicle is further configured to:
restrict switching from the first state to the second state when the first operator is determined to not visually recognize the unmanned aerial vehicle or when the second operator is determined to not visually recognize the unmanned aerial vehicle; and
switch from the first state to the second state when the first operator is determined to visually recognize the unmanned aerial vehicle and the second operator is determined to visually recognize the unmanned aerial vehicle.

5. The unmanned aerial vehicle control system according to claim 3, wherein the controller of the unmanned aerial vehicle is further configured to:
automatically switch from the first state to the second state when the first operator is determined to not visually recognize the unmanned aerial vehicle and the second operator is determined to visually recognize the unmanned aerial vehicle.

6. The unmanned aerial vehicle control system according to claim 1, wherein the controller of the second wireless operation device is further configured to issue a predetermined notification to the second operator when the first state is to be switched to the second state.

7. The unmanned aerial vehicle control system according to claim 1, wherein the controller of the unmanned aerial vehicle is further configured to:
receive the switching instruction from the second wireless operation device when the enabled switching instruction operation component has been operated by the second operator, and
switch from the first state to the second state based on the determination that the switching instruction has been received.

8. The unmanned aerial vehicle control system according to claim 1, wherein the controller of the unmanned aerial vehicle is further configured to:
determine whether or not the unmanned aerial vehicle is located within a predetermined switching region, and
switch from the first state to the second state further based on the determination regarding the unmanned aerial vehicle being located within the predetermined switching region.

9. The unmanned aerial vehicle control system according to claim 1, further comprising:
a photographing device in communication with the second wireless operation device; and
wherein the first predetermined determination method includes determining whether or not the second operator visually recognizes the unmanned aerial vehicle based on an image picked up by the photographing device.

10. The unmanned aerial vehicle control system according to claim 9,
wherein the unmanned aerial vehicle further includes a light emitter configured to output a predetermined pattern of light, and
wherein the first predetermined determination method includes determining whether or not the second operator visually recognizes the unmanned aerial vehicle by determining, based on the image, whether or not the predetermined pattern of light is detected.

11. The unmanned aerial vehicle control system according to claim 1,
wherein the unmanned aerial vehicle includes an output device configured to output a directional radio wave or a directional sound wave, and
wherein the second wireless operation device includes a detector and the controller of the second wireless operation device is further configured to determine whether or not the second operator visually recognizes the unmanned aerial vehicle based on the directional radio wave or the directional sound wave detected by the detector.

12. The unmanned aerial vehicle control system according to claim 1,
wherein the controller of the second wireless operation device is further configured to:
acquire unmanned aerial vehicle positional information on a position of the unmanned aerial vehicle;
acquire operator positional information on a position of the second operator, and
determine whether the second operator visually recognizes the unmanned aerial vehicle based on the operator positional information and the unmanned aerial vehicle positional information.

13. The unmanned aerial vehicle control system according to claim 1,
wherein the controller of the second wireless operation device is further configured to:
accept instructions from the second operator, and
determine that the second operator visually recognizes the unmanned aerial vehicle when instruction information, indicating that a predetermined operation has been performed, is accepted.

14. An unmanned aerial vehicle control method, comprising:
controlling, via a controller of an unmanned aerial vehicle, flying by the unmanned aerial vehicle based on first instruction information transmitted by a first wireless operation device or second instruction information transmitted by a second wireless operation device, wherein the first wireless operation device holds operation authority and the second wireless operation device does not hold the operation authority;

determining, via a controller of the second wireless operation device, based on a first predetermined determination method, whether or not a second operator, who operates the second wireless operation device, visually recognizes the unmanned aerial vehicle;

enabling, via the controller of the second wireless operation device, a switching instruction operation component of the second wireless operation device based on the determination regarding the second operator, wherein the switching instruction operation component is disabled in advance;

sending, via the controller of the second wireless operation device, a switching instruction, to request the operation authority to control the unmanned aerial vehicle when the enabled switching instruction operation component is operated by the second operator;

determining, via the controller of the unmanned aerial vehicle, whether or not the switching instruction is received from the second wireless operation device; and switching or restricting switching, via the controller of the unmanned aerial vehicle, from a first state to a second state based on the determination regarding receipt of the switching instruction, wherein switching from the first state to the second state transfers the operation authority from the first wireless operation device to the second wireless operation device, and wherein the unmanned aerial vehicle flies in accordance with the first instruction information in the first state and the unmanned aerial vehicle flies in accordance with the second instruction information in the second state.

* * * * *